US011778517B2

(12) United States Patent
Dutta et al.

(10) Patent No.: US 11,778,517 B2
(45) Date of Patent: Oct. 3, 2023

(54) RESOURCE RESERVATION INFORMATION SHARING WITH DATA

(71) Applicant: QUALCOMM Incorporated, San Diego, CA (US)

(72) Inventors: Sourjya Dutta, San Diego, CA (US); Tien Viet Nguyen, Bridgewater, NJ (US); Gabi Sarkis, San Diego, CA (US); Shuanshuan Wu, San Diego, CA (US); Kapil Gulati, Belle Mead, NJ (US); Shailesh Patil, San Diego, CA (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/447,657

(22) Filed: Sep. 14, 2021

(65) Prior Publication Data

US 2023/0082057 A1   Mar. 16, 2023

(51) Int. Cl.
*H04W 28/26* (2009.01)
*H04W 72/20* (2023.01)
*H04L 1/1607* (2023.01)
*H04W 24/08* (2009.01)

(52) U.S. Cl.
CPC ........... *H04W 28/26* (2013.01); *H04L 1/1614* (2013.01); *H04W 24/08* (2013.01); *H04W 72/20* (2023.01)

(58) Field of Classification Search
None
See application file for complete search history.

(56) References Cited

U.S. PATENT DOCUMENTS

| 2020/0236655 | A1 | 7/2020 | Bharadwaj et al. |
| 2021/0051628 | A1* | 2/2021 | Zhang .................. H04W 72/121 |
| 2021/0067303 | A1 | 3/2021 | Taherzadeh Boroujeni et al. |
| 2021/0266885 | A1 | 8/2021 | Sarkis et al. |
| 2022/0086803 | A1* | 3/2022 | Li ...................... H04W 72/0446 |
| 2022/0104126 | A1* | 3/2022 | Lee .................... H04W 52/0219 |
| 2022/0225292 | A1* | 7/2022 | Mohammad Soleymani .............. H04W 72/20 |
| 2022/0330261 | A1* | 10/2022 | Yeo ........................ H04L 5/0053 |

OTHER PUBLICATIONS

International Search Report and Written Opinion—PCT/US2022/074520—ISA/EPO—dated Oct. 24, 2022.

(Continued)

*Primary Examiner* — Saumit Shah
(74) *Attorney, Agent, or Firm* — Harrity & Harrity LLP

(57) ABSTRACT

Various aspects of the present disclosure generally relate to wireless communication. In some aspects, a first user equipment (UE) may receive, from one or more additional UEs, one or more indicators corresponding to one or more resource reservations. Accordingly, the UE may transmit data, to a second UE, on a sidelink channel, with at least one resource reservation, of the one or more resource reservations, indicated within a control element transmitted with the data. For example, the control element may include a list or a bitmap indicating the at least one resource reservation. Numerous other aspects are described.

28 Claims, 12 Drawing Sheets

(56) References Cited

OTHER PUBLICATIONS

LG Electronics: "Discussion on Inter-UE Coordination for Mode 2 Enhancements", 3GPP TSG RAN WG1 Meeting #106e, R1-2107529, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, 31 Pages, XP052038442, paragraph [0001]—paragraph [0002], Section 2.4.

Qualcomm Incorporated: "Reliability and Latency Enhancements for Mode 2", R1-2108627, 3GPP TSG RAN WG1 Meeting #106-e, 3rd Generation Partnership Project (3GPP), Mobile Competence Centre, 650, Route Des Lucioles, F-06921 Sophia-Antipolis Cedex, France, Aug. 16-27, 2021, 39 Pages, Aug. 27, 2021, XP052042854, The whole document.

\* cited by examiner

RESOURCE RESERVATION INFORMATION SHARING WITH DATA

FIELD OF THE DISCLOSURE

Aspects of the present disclosure generally relate to wireless communication and to techniques and apparatuses for transmitting and receiving resource reservation information with data.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a first user equipment (UE). The apparatus may include a memory and one or more processors coupled to the memory. The one or more processors may be configured to receive, from one or more additional UEs, one or more indicators corresponding to one or more resource reservations. The one or more processors may be further configured to transmit data, to a second UE, on a sidelink channel, wherein at least one resource reservation, of the one or more resource reservations, is indicated within a control element transmitted with the data.

Some aspects described herein relate to an apparatus for wireless communication at a first UE. The apparatus may include a memory and one or more processors coupled to the memory. The one or more processors may be configured to receive, from a second UE and on a sidelink channel, data, wherein at least one resource reservation is indicated within a control element received with the data. The one or more processors may be further configured to transmit, on the sidelink channel, based at least in part on resource exclusion using the at least one resource reservation.

Some aspects described herein relate to a method of wireless communication performed by a first UE. The method may include receiving, from one or more additional UEs, one or more indicators corresponding to one or more resource reservations. The method may further include transmitting data, to a second UE, on a sidelink channel, wherein at least one resource reservation, of the one or more resource reservations, is indicated within a control element transmitted with the data.

Some aspects described herein relate to a method of wireless communication performed by a first UE. The method may include receiving, from a second UE and on a sidelink channel, data, wherein at least one resource reservation is indicated within a control element received with the data. The method may further include transmitting, on the sidelink channel, based at least in part on resource exclusion using the at least one resource reservation.

Some aspects described herein relate to a non-transitory computer-readable medium that stores a set of instructions for wireless communication by a first UE. The set of instructions, when executed by one or more processors of the first UE, may cause the first UE to receive, from one or more additional UEs, one or more indicators corresponding to one or more resource reservations. The set of instructions, when executed by one or more processors of the first UE, may further cause the first UE to transmit data, to a second UE, on a sidelink channel, wherein at least one resource reservation, of the one or more resource reservations, is indicated within a control element transmitted with the data.

Some aspects described herein relate to a non-transitory computer-readable medium that stores a set of instructions for wireless communication by a first UE. The set of instructions, when executed by one or more processors of the first UE, may cause the first UE to receive, from a second UE and on a sidelink channel, data, wherein at least one resource reservation is indicated within a control element received with the data. The set of instructions, when executed by one or more processors of the first UE, may further cause the first UE to transmit, on the sidelink channel, based at least in part on resource exclusion using the at least one resource reservation.

Some aspects described herein relate to an apparatus for wireless communication. The apparatus may include means for receiving, from one or more additional UEs, one or more indicators corresponding to one or more resource reservations. The apparatus may further include means for transmitting data, to a UE, on a sidelink channel, wherein at least one resource reservation, of the one or more resource reservations, is indicated within a control element transmitted with the data.

Some aspects described herein relate to an apparatus for wireless communication. The apparatus may include means for receiving, from a UE and on a sidelink channel, data, wherein at least one resource reservation is indicated within a control element received with the data. The apparatus may further include means for transmitting, on the sidelink channel, based at least in part on resource exclusion using the at least one resource reservation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
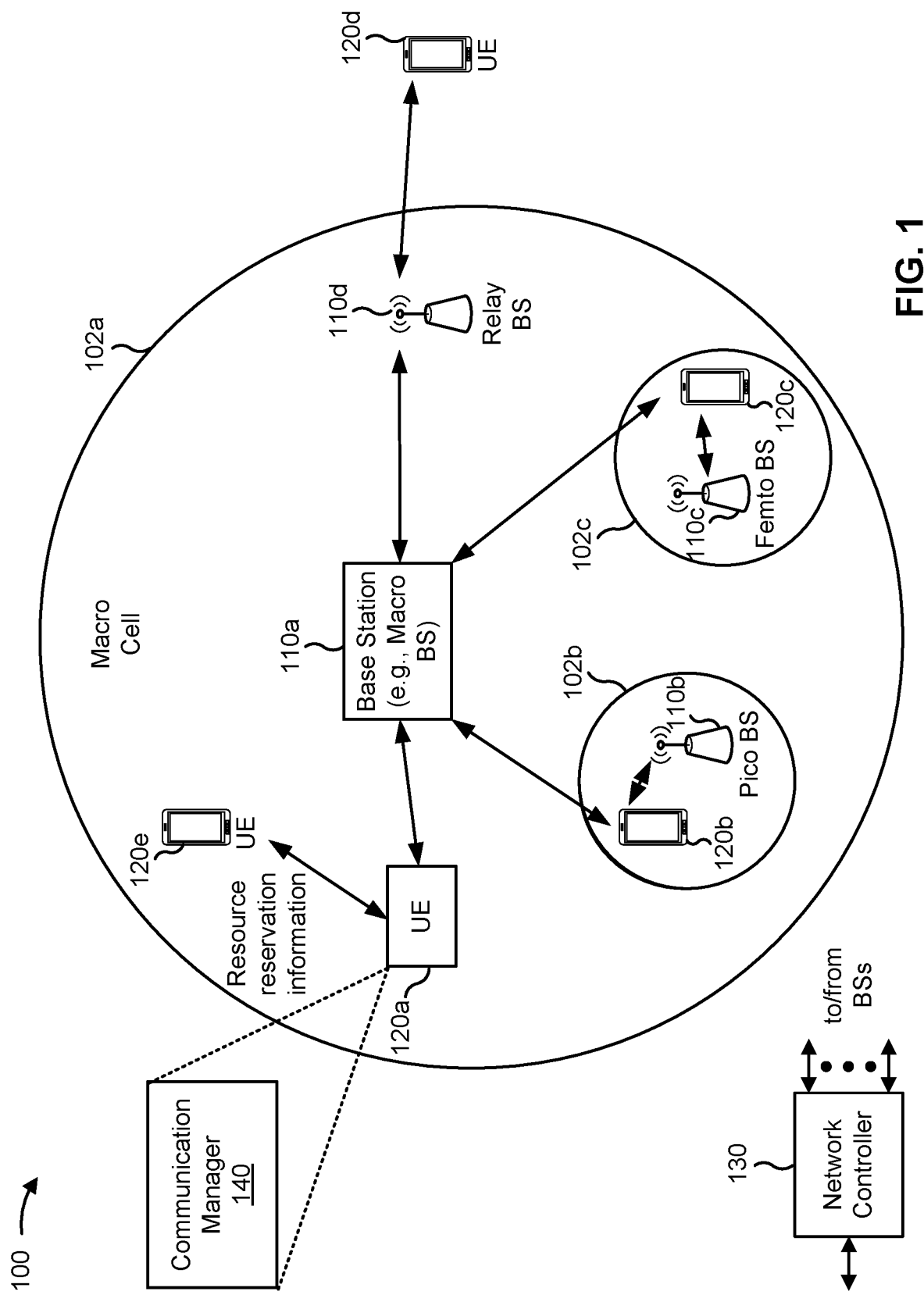
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120a may include a communication manager 140. As shown in FIG. 1 and as described in more detail elsewhere herein, the communication manager 140 may receive one or more indicators corresponding to one or more resource reservations and transmit data (e.g., to the UE 120e) on a sidelink channel, wherein at least one resource reservation, of the one or more resource reservations, is indicated within a control element transmitted with the data. Additionally, or alternatively, the communication manager 140 may receive (e.g., from the UE 120e) on a sidelink channel, data, wherein at least one resource reservation is indicated within a control element received with the data, and transmit on the sidelink channel based at least in part on resource exclusion using the at least one resource reservation. Additionally, or alternatively, the communication manager 140 may perform one or more other operations described herein.

As indicated above, FIG. 1 is provided as an example. Other examples may differ from what is described with regard to FIG. 1.

Figure 2:
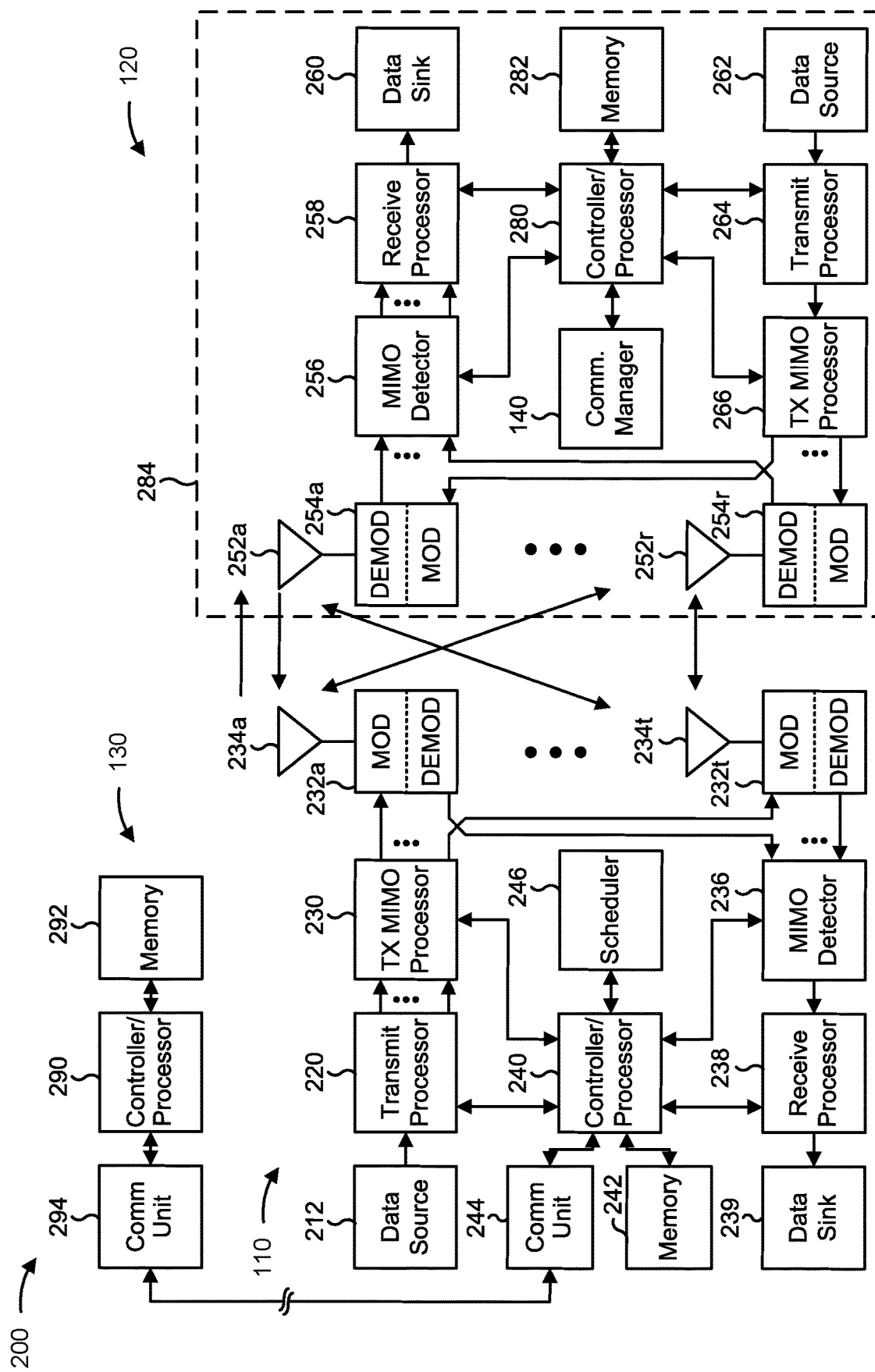
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the base station 110, the controller/processor 280 of the UE 120, and/or any other component(s) of FIG. 2 may perform one or more techniques associated with transmitting and receiving resource reservation information with data, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a first UE (e.g., the UE 120 and/or apparatus 1200 of FIG. 12) may include means for receiving, from one or more additional UEs, one or more indicators corresponding to one or more resource reservations; and/or means for transmitting data, to a second UE, on a sidelink channel, wherein at least one resource reservation, of the one or more resource reservations, is indicated within a control element transmitted with the data. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a first UE (e.g., the UE 120 and/or apparatus 1200 of FIG. 12) may include means for receiving, from a second UE and on a sidelink channel, data, wherein at least one resource reservation is indicated within a control element received with the data; and/or means for transmitting, on the sidelink channel, based at least in part on resource exclusion using the at least one resource reservation. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
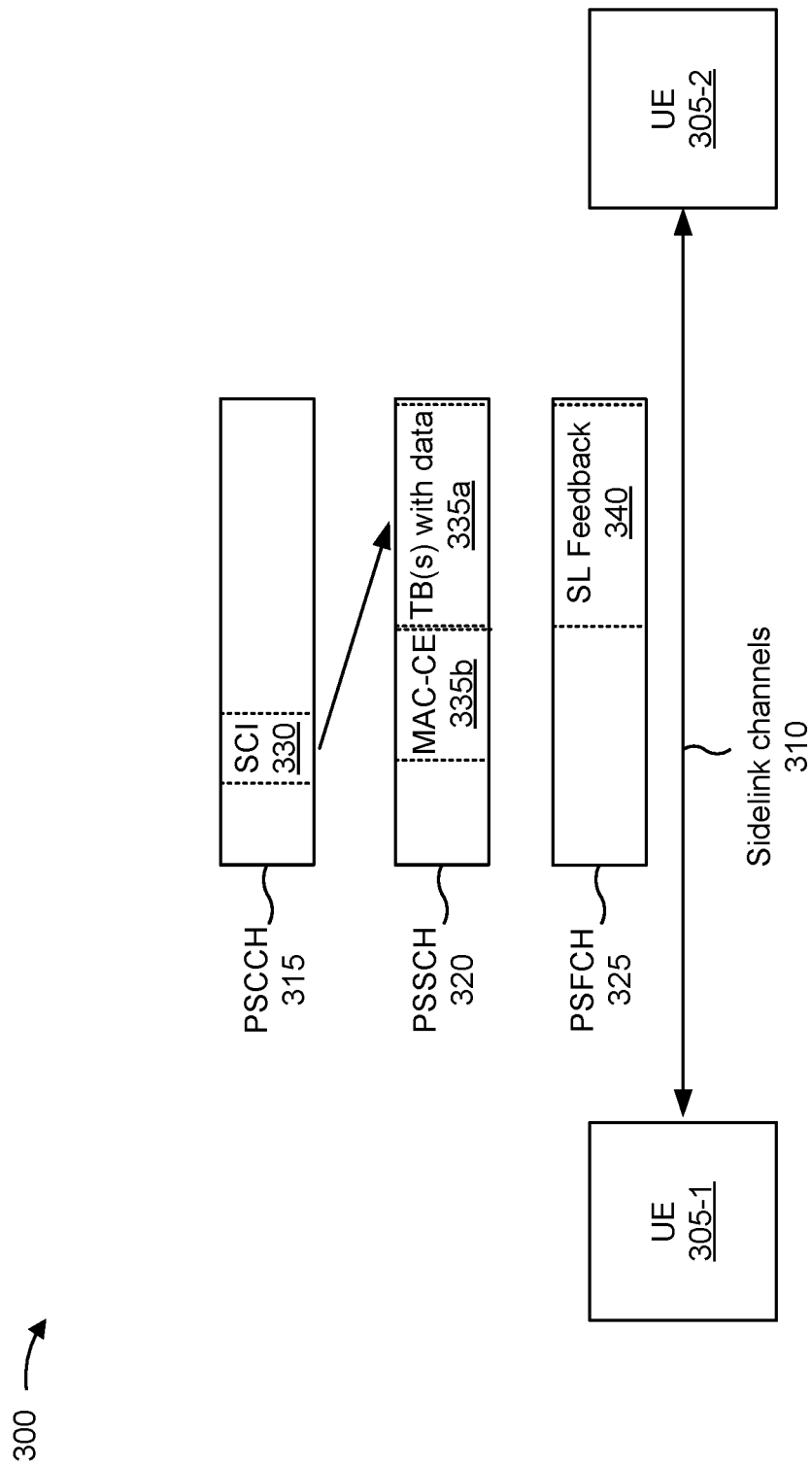
FIG. 3 is a diagram illustrating an example of sidelink communications, in accordance with the present disclosure.

FIG. 3 is a diagram illustrating an example 300 of sidelink communications, in accordance with the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335*a* may be carried on the PSSCH 320. The TB 335*a* may include data. As shown in FIG. 3, and as described herein, the TB 335*a* may be sent with a control element (e.g., a medium access control (MAC) layer control element (MAC-CE) 335*b*) that indicates one or more resource reservations (e.g., received by the UE 305-1 and/or the UE 305-2 and/or generated by a MAC layer of the UE 305-1 and/or the UE 305-2). The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335*a*), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
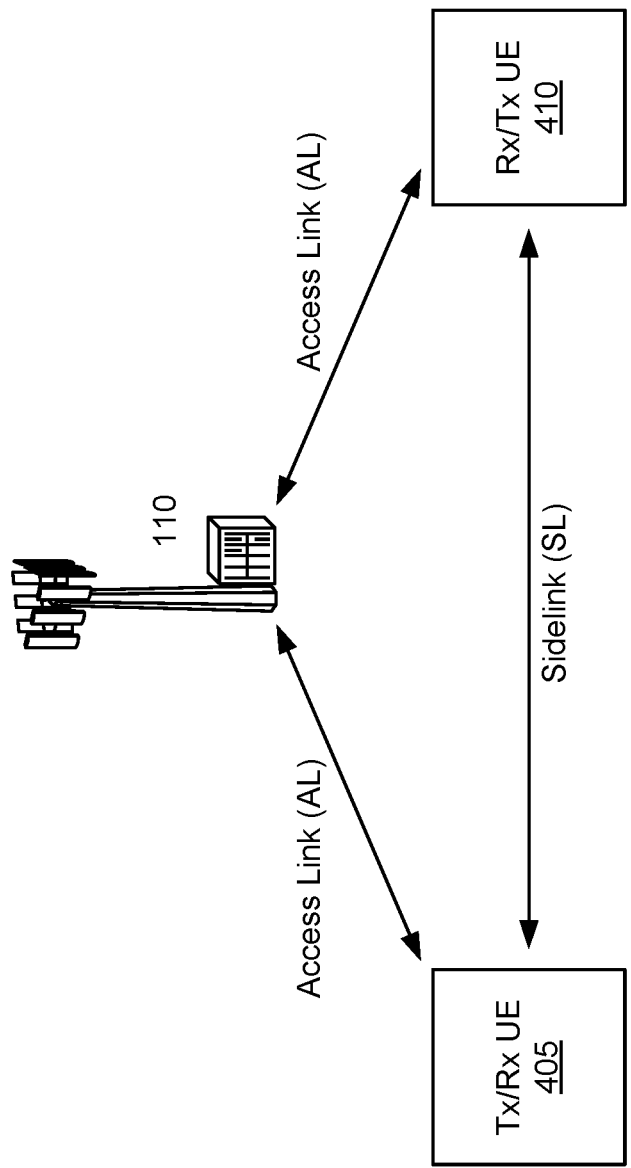
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure. As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
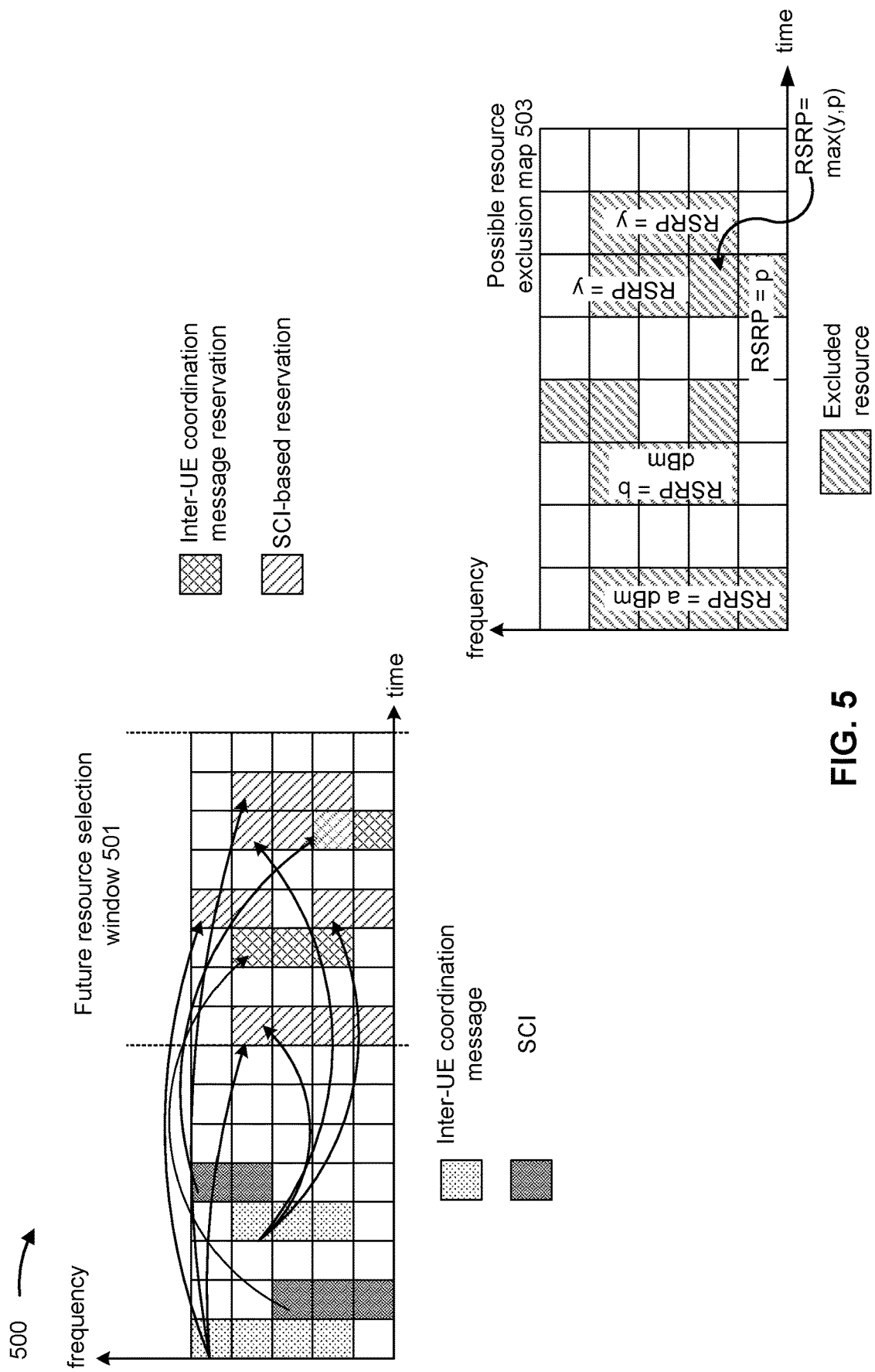
FIG. 5 is a diagram illustrating an example of resource exclusion, in accordance with the present disclosure.

FIG. 5 is a diagram illustrating an example 500 of resource exclusion, in accordance with the present disclosure. As shown in FIG. 5, a UE (e.g., UE 120) may receive SCI (e.g., SCI-1 and/or SCI-2) from nearby devices (e.g., other UEs) that indicate resources (e.g., frequency resources and/or time resources, as shown in FIG. 5) within a future resource selection window 501 that will be used by the nearby devices. Additionally, or alternatively, the UE 120 may receive resource reservation indicators (e.g., transmitted by nearby devices as inter-UE coordination messages) that indicate resources within future resource selection window 501 that will be used by other devices (e.g., devices from which the nearby devices received SCI indicating the resources).

Accordingly, as further shown in FIG. 5, the UE 120 may apply resource exclusion when determining resources to use within the future resource selection window 501 (e.g., for transmissions to other UEs on a sidelink channel, as described in connection with FIG. 3 and/or FIG. 4). In example 500, the UE 120 may apply an RSRP value based at least in part on an RSRP associated with corresponding SCI and/or inter-UE coordination messages. Accordingly, as shown in FIG. 5, the UE 120 may apply one value (shown as a) for resources associated with one SCI and another value (shown as y) for resources associated with another SCI. As further shown in FIG. 5, the UE 120 may apply one value (shown as b) for resources associated with one inter-UE coordination message and another value (shown asp) for resources associated with another inter-UE coordination message. If resources overlap (e.g., a resource is reserved by both SCI and an inter-UE coordination message, as shown in FIG. 5, or a resource is reserved by multiple SCI and/or multiple inter-UE coordination messages), the UE 120 may apply a maximum of associated RSRP values (e.g., a maximum of p or y in example 500). Accordingly, the UE 120 may generate possible resource exclusion map 503, as shown in FIG. 5.

In order to transmit standalone inter-UE coordination messages, a UE consumes sidelink resources. However, transmitting resource reservation information in the inter-UE coordination messages increases signaling overhead and can result in increased congestion and interference to other nearby devices (e.g., other UEs). Increased congestion and interference waste processing resources and power because more signals may be lost, which results in more retransmissions.

Some techniques and apparatuses described herein enable a first UE (e.g., UE 120a) to transmit resource reservation information in a control element (e.g., a MAC-CE) with data. As a result, the first UE 120a transmits the resource reservation information with buffered data in order to conserve network resources and reduce congestion and interference to nearby devices (e.g., other UEs). Some techniques and apparatuses described herein additionally enable the second UE 120b to selectively decode the MAC-CE in order to conserve power and processing resources.

Additionally, or alternatively, some techniques and apparatuses described herein additionally enable the second UE 120b to apply resource exclusion based at least in part on the MAC-CE in order to increase chances of successful reception of a signal at the first UE 120a and/or the second UE 120b, which conserves power and processing resources.

As indicated above, FIG. 5 is provided as an example. Other examples may differ from what is described with respect to FIG. 5.

Figure 6:
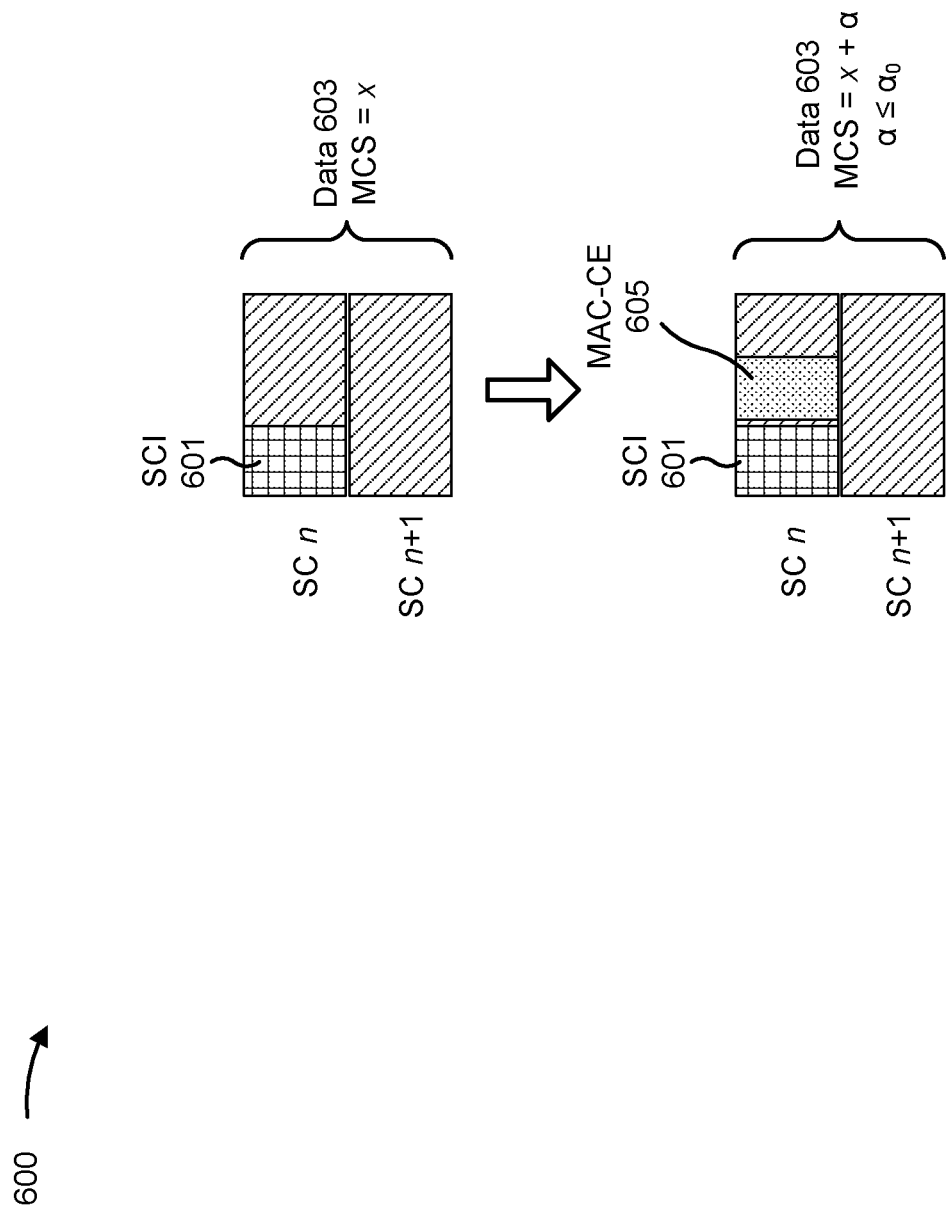
FIG. 6 is a diagram illustrating an example associated with transmitting a control element, indicating resource reservations, with data, in accordance with the present disclosure.

FIG. 6 is a diagram illustrating an example 600 associated with transmitting a control element, indicating resource reservations, with data, in accordance with the present disclosure. As shown in FIG. 6, example 600 includes an SCI 601 (e.g., SCI-1 and/or SCI-2) used to reserve resources (e.g., one or more subcarriers, such as subcarrier n and subcarrier n+1) for a data transmission 603. For example, a UE (such as UE 120) may select the resources based at least in part on the data 603 in a buffer of the UE 120 (e.g., a buffer of data to transmit to another UE on a sidelink channel, as described in connection with FIG. 3 and/or FIG. 4).

As further shown in FIG. 6, the UE 120 may select the resources to use based at least in part on an MCS for the data transmission 603. For example, the UE 120 may use an MCS with value represented by x according to a configuration associated with the sidelink channel and/or measurements associated with the sidelink channel that the UE 120 uses to determine which MCS values may be used on the sidelink channel.

In order to indicate resource reservations to the UE for which the data 603 is intended, the UE 120 determines a size for a control element (e.g., MAC-CE 605) that can be transmitted with the data 603. In some aspects, the size for the MAC-CE 605 is based at least in part on a minimum size. For example, the minimum size may be a quantity of bits to transmit a single resource reservation indicator (e.g., a list, as described in connection with FIG. 7, including one resource reservation indicator) or a quantity of bits to transmit a bitmap (e.g., as described in connection with FIG. 8). In some aspects, the minimum size is a programmed (and/or otherwise preconfigured) value stored in the memory of the UE 120 (e.g., according to 3GPP specifications and/or another standard). Additionally, or alternatively, the minimum size may be indicated by a base station (e.g., base station 110, via a radio resource control (RRC) configuration). In a combinatory example, the base station 110 may indicate a value to use for the minimum size from a plurality of possible values stored in the memory of the UE 120 (e.g., according to 3GPP specifications and/or another standard).

Additionally, or alternatively, the size for the MAC-CE 605 is based at least in part on a maximum size. In some aspects, the maximum size is a programmed (and/or otherwise preconfigured) value stored in the memory of the UE 120 (e.g., according to 3GPP specifications and/or another standard). Additionally, or alternatively, the maximum size may be indicated by a base station (e.g., base station 110, via an RRC configuration). In a combinatory example, the base station 110 may indicate a value to use for the maximum size from a plurality of possible values stored in the memory of the UE 120 (e.g., according to 3GPP specifications and/or another standard).

By encoding the MAC-CE 605 within the resources reserved for the data 603, an MCS for the data transmission 603 is increased. For example, the UE 120 may use an MCS with value represented by x+α, wherein α represents the increase caused by encoding the MAC-CE 605 with the data 603. In order to maintain sufficient reliability for the data 603 when transmitted, the UE 120 determines a maximum MCS increase (e.g., represented by $α_0$) that is used to determine the size for the MAC-CE 605 that can be transmitted with the data 603.

In some aspects, the maximum MCS increase may be a programmed (and/or otherwise preconfigured) value stored in the memory of the UE 120 (e.g., according to 3GPP specifications and/or another standard). Additionally, or alternatively, the maximum MCS increase may be indicated by a base station (e.g., base station 110, via an RRC configuration). In a combinatory example, the base station 110 may indicate a value to use for the maximum MCS increase from a plurality of possible values stored in the memory of the UE 120 (e.g., according to 3GPP specifications and/or another standard).

Additionally, or alternatively, the UE 120 may determine the maximum MCS increase based at least in part on a priority associated with the data 603. For example, the maximum MCS increase may be smaller when the priority is higher. In some aspects, the UE 120 may be programmed (and/or otherwise preconfigured) with a table, a formula, and/or another algorithm in the memory of the UE 120 (e.g., according to 3GPP specifications and/or another standard), where the algorithm accepts the priority as input and outputs the maximum MCS increase to use. Additionally, or alternatively, the algorithm may be indicated by a base station (e.g., base station 110, via an RRC configuration). For example, the base station 110 may indicate an algorithm to use from a plurality of possible algorithms stored in the memory of the UE 120 (e.g., according to 3GPP specifications and/or another standard).

Additionally, or alternatively, the UE 120 may determine the maximum MCS increase based at least in part on a retransmission count associated with the data 603. For example, the maximum MCS increase may be smaller when the retransmission count is higher. In some aspects, the UE 120 may be programmed (and/or otherwise preconfigured) with a table, a formula, and/or another algorithm in the memory of the UE 120 (e.g., according to 3GPP specifications and/or another standard), where the algorithm accepts the retransmission count as input and outputs the maximum MCS increase to use. Additionally, or alternatively, the algorithm may be indicated by a base station (e.g., base station 110, via an RRC configuration). For example, the base station 110 may indicate an algorithm to use from a plurality of possible algorithms stored in the memory of the UE 120 (e.g., according to 3GPP specifications and/or another standard).

Additionally, or alternatively, the UE 120 may determine the maximum MCS increase based at least in part on whether a resource reservation for the data 603 has been indicated in a previous transmission (e.g., a previous SCI, such as SCI-1, reserved the resources used for transmitting the data 603). For example, the maximum MCS increase may be smaller when the resource reservation for the data 603 has not been indicated in a previous transmission. In some aspects, the UE 120 may be programmed (and/or otherwise preconfigured) with a table, a formula, and/or another algorithm in the memory of the UE 120 (e.g., according to 3GPP specifications and/or another standard), where the algorithm outputs the maximum MCS increase to use based on whether the resource reservation for the data 603 has been indicated in a previous transmission. Additionally, or alternatively, the algorithm may be indicated by a base station (e.g., base station 110, via an RRC configuration). For example, the base station 110 may indicate an algorithm to use from a plurality of possible algorithms stored in the memory of the UE 120 (e.g., according to 3GPP specifications and/or another standard).

In some aspects, the UE 120 may encode the MAC-CE 605 within one or more padding bits of the data 603. For example, the data 603 may include one or more zeroes or ones that pad a beginning, a middle, or an end of the data 603. Accordingly, in some aspects, the UE 120 may encode the MAC-CE 605 without increasing the MCS associated with the data 603 (e.g., α=0). Therefore, in some aspects, the maximum MCS increase may be set to zero (e.g., $α_0$=0) such that the MAC-CE 605 is only transmitted with the data 603 when the data 603 includes one or more padding bits (and, in some aspects, sufficient padding bits to satisfy a minimum size for the MAC-CE 605, as described above).

By using techniques as described in connection with FIG. 6, the UE 120 transmits resource reservation information in the MAC-CE 605 with the data 603. As a result, the UE 120 conserves network resources and reduces congestion and interference to nearby devices (e.g., other UEs).

As indicated above, FIG. 6 is provided as an example. Other examples may differ from what is described with respect to FIG. 6.

Figure 7:
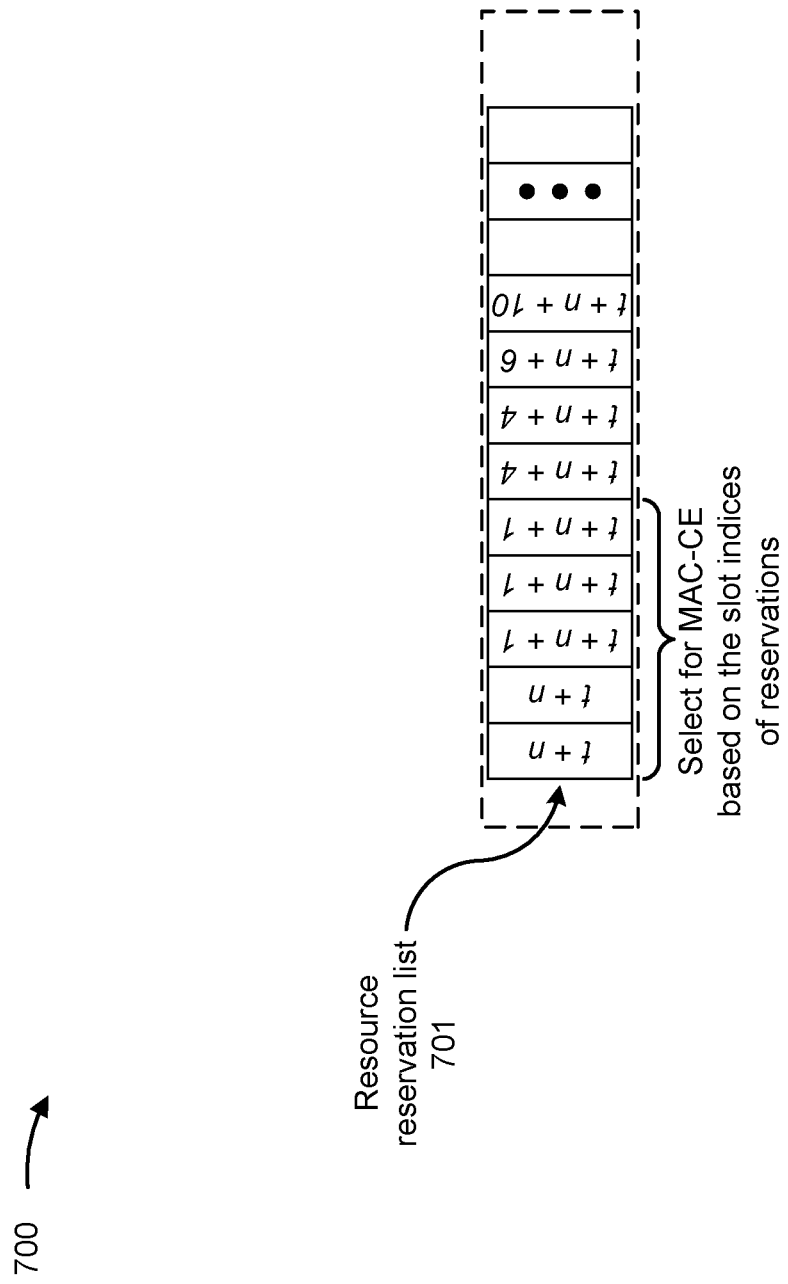
FIGS. 7 and 8 are diagrams illustrating examples associated with control elements indicating resource reservations, in accordance with the present disclosure.

FIG. 7 is a diagram illustrating an example 700 associated with a control element indicating resource reservations, in accordance with the present disclosure. As shown in FIG. 7, example 700 includes a list 701 that includes indicators of one or more resource reservations. As further shown in FIG. 7, the list 701 may indicate at least one resource reservation selected from a plurality of resource reservations.

In some aspects, a UE (e.g., UE 120) may select at least one resource reservation to indicate in the list 701 based at least in part on times associated with the plurality of resource reservations. For example, as shown in FIG. 7, two resource reservations are associated with a slot and/or symbol associated with an index represented by t+n, where t represents the slot and/or symbol in which the UE 120 is performing the selection. Accordingly, in example 700, the two resource reservations associated with slot and/or symbol t+n are prioritized over resource reservations associated with slot and/or symbol t+n+1, t+n+4, t+n+6, t+n+10, and so on.

Additionally, or alternatively, the UE 120 may select at least one resource reservation to indicate in the list 701 based at least in part on signal strengths (e.g., RSRP measurements) and/or qualities (e.g., RSRQ parameters) associated with indicators of the plurality of resource reservations. For example, the UE 120 may prioritize resource reservations that were received (e.g., in SCI and/or inter-UE coordination messages) in signals having higher RSRP and/or RSRQ. In some aspects, the UE 120 may combine the times with the signal strengths/qualities to perform the selection. For example, the UE 120 may prioritize by time (as described above) and break any ties (e.g., prioritize between resource reservations associated with a same slot and/or symbol) using the signal strengths/qualities. In another example, the UE 120 may prioritize by signal strengths/qualities and break any ties (e.g., prioritize between resource reservations associated with a same signal strength/quality) using the times. In another example, the UE 120 may calculate a score based at least in part on a combination of the times and the signal strengths/qualities and prioritize the resource reservations by score.

Additionally, or alternatively, the UE 120 may select at least one resource reservation to indicate in the list 701 based at least in part on distances between the UE 120 and one or more additional UEs associated with the plurality of resource reservations (e.g., UEs from which the resource reservations were received in SCI and/or inter-UE coordination messages). For example, the UE 120 may prioritize resource reservations that were received from UEs that are closer to the UE 120. In some aspects, the UE 120 may combine the distances with the times and/or the signal strengths/qualities to perform the selection. For example, the UE 120 may prioritize by time (as described above) and break any ties (e.g., prioritize between resource reservations associated with a same slot and/or symbol) using the distances. In another example, the UE 120 may prioritize by distance and break any ties (e.g., prioritize between resource reservations associated with a same distance) using the times. In another example, the UE 120 may calculate a score based at least in part on a combination of two or more of the times, the signal strengths/qualities, and the distances, and prioritize the resource reservations by score.

In some aspects, the UE 120 may further select at least one resource reservation to indicate in the list 701 based at least in part on whether the UE 120 is an intended recipient of a signal associated with the at least one resource reservation. For example, the UE 120 may apply an exception such that resource reservations for which the UE 120 is an intended recipient are included regardless of times, signal strengths/qualities, and/or distances associated with the resource reservations. In another example, the UE 120 may calculate a score, as described above, and increase the score for resource reservations for which the UE 120 is an intended recipient.

In some aspects, the UE 120 may further select at least one resource reservation to indicate in the list 701 based at least in part on hop counts associated with indicators of the plurality of resource reservations. For example, the UE 120 may prioritize resource reservations that were received from UEs reserving resources for themselves (e.g., by transmitting SCI) and thus associated with hop counts of zero as compared with resource reservations that were received from UEs forwarding resource reservations from other UEs and thus associated with hop counts of one or higher (e.g., by transmitting or forwarding inter-UE coordination messages). In one example, the UE 120 may use hop counts to break ties within a prioritization based on one or more of the factors described above. In another example, the UE 120 may calculate a score, as described above, and increase the score for resource reservations associated with lower hop counts.

In some aspects, the UE 120 may further select at least one resource reservation to indicate in the list 701 based at least in part on periodicities associated with indicators of the plurality of resource reservations. For example, the UE 120 may prioritize resource reservations that are aperiodic as compared with resource reservations that are periodic. Accordingly, the resource reservations that are periodic can be reported in future control elements. Additionally, or alternatively, the UE 120 may prioritize resource reservations with shorter periods. Resource reservations with shorter periods are more likely to result in persistent interference and thus more likely to waste processing resources and power as compared with resource reservations with longer periods. In one example, the UE 120 may use periodicities to break ties within a prioritization based on one or more of the factors described above. In another example, the UE 120 may calculate a score, as described above, and increase the score for resource reservations that are aperiodic and/or associated with smaller periodicities.

The UE 120 may therefore select a quantity of resource reservations (e.g., represented by N) according to a size of the control element that will include the list 701 (e.g., where the size is determined as described in connection with FIG. 6). In example 500, N=5 such that five resource reservations, out of the plurality of resource reservations that were received, are indicated in the list 701.

By using techniques as described in connection with FIG. 7, the UE 120 transmits resource reservation information in a list included in a MAC-CE with data. As a result, the UE 120 conserves network resources and reduces congestion and interference to nearby devices (e.g., other UEs).

As indicated above, FIG. 7 is provided as an example. Other examples may differ from what is described with respect to FIG. 7.

Figure 8:
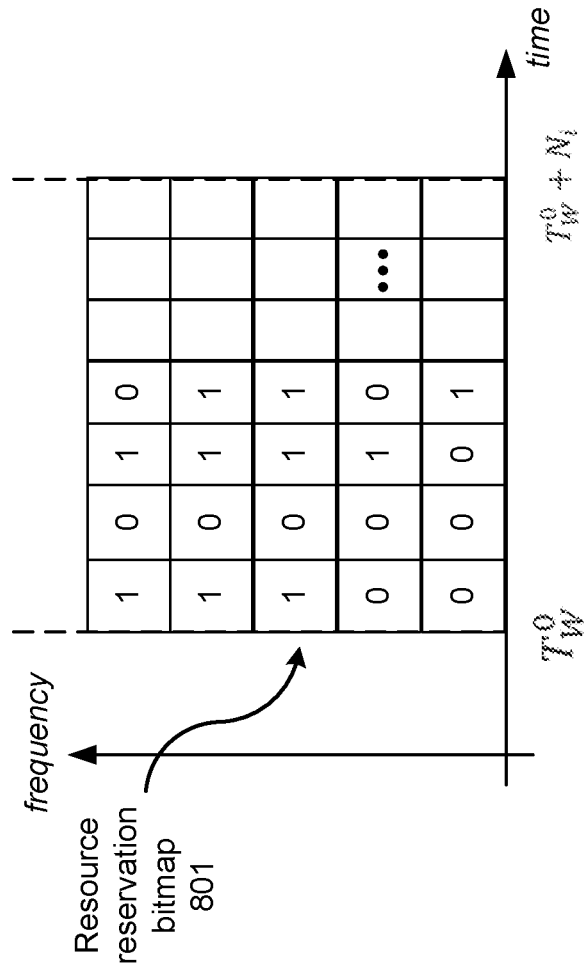

FIG. 8 is a diagram illustrating an example 800 associated with a control element indicating resource reservations, in accordance with the present disclosure. As shown in FIG. 8, example 800 includes a bitmap 801 that includes indicators of one or more resource reservations. For example, a bit of the bitmap 801 may be coded to "1" or "TRUE" when at least one resource reservation is in the slot/symbol and the subchannel (and/or subcarrier and/or frequency range) associated with the bit. Similarly, a bit of the bitmap 801 may be coded to "0" or "FALSE" when no resource reservation is in the slot/symbol and the subchannel (and/or subcarrier and/or frequency range) associated with the bit.

In some aspects, a size of the bitmap 801 may be fixed. For example, the size may be based on a quantity of subchannels (and/or subcarriers and/or frequency ranges) (e.g., represented by $N_{SC}$) and a quantity of slots (and/or symbols) (e.g., represented by $N_{TTI}$). As an alternative, the size of the bitmap 801 may be based at least in part on a size of the control element that will include the bitmap 801 (e.g., where the size is determined as described in connection with FIG. 6). For example, the bitmap 801 may indicate a variable quantity of slots (and/or symbols) (e.g., represented by $N_t$) that increases as the size of the control element increases.

Additionally, the bitmap 801 may be associated with a starting slot (and/or starting symbol and/or starting subframe index) (e.g., represented by $T_W^0$). In some aspects, the starting slot, symbol, and/or subframe is based on a programmed (and/or otherwise preconfigured) value stored in the memory of the UE 120 (e.g., according to 3GPP specifications and/or another standard), such as an offset from a current slot, symbol, and/or subframe. Additionally, or alternatively, the starting slot, symbol, and/or subframe index may be indicated in the control information. Additionally, or alternatively, the starting slot, symbol, and/or subframe index may be indicated by a base station (e.g., base station 110, via an RRC configuration). In some aspects, the base station 110 may indicate an offset to use for the starting slot, symbol, and/or subframe index from a plurality of possible offsets stored in the memory of the UE 120 (e.g., according to 3 GPP specifications and/or another standard).

In some aspects, the bitmap 801 may indicate one or more aperiodic resource reservations. Additionally, or alternatively, the bitmap 801 may indicate one or more periodic resource reservations. Accordingly, the bitmap 801 may be associated with a single periodicity, and the UE 120 may transmit one or more additional bitmaps associated with one or more additional periodicities (e.g., as permitted by the size of the control element as determined, for example, according to the description associated with FIG. 6).

In some aspects, the UE 120 may select resource reservations associated with a shortest periodicity to include in bitmap 801 and discard resource reservations associated with longer periodicities. Accordingly, the UE 120 may prioritize resource reservations according to periodicity. Additionally, or alternatively, the UE 120 may select a resource reservation associated with a highest priority to include in bitmap 801 and include additional resource reservations associated with a same periodicity as the resource reservation associated with the highest priority. Accordingly, the UE 120 may prioritize resource reservations according to priority.

As an alternative, the UE 120 may transmit a bitmap indicating resource reservations associated with different periodicities. For example, the UE 120 may select resource reservations associated with a first periodicity to indicate in the bitmap and additionally select resource reservations associated with periodicities smaller than the first periodicity to indicate in the bitmap. In some aspects, the UE 120 may indicate resource reservations associated with different periodicities when one of the different periodicities is an integer multiple of another of the different periodicities.

By using techniques as described in connection with FIG. 8, the UE 120 transmits resource reservation information in a bitmap included in a MAC-CE with data. As a result, the UE 120 conserves network resources and reduces congestion and interference to nearby devices (e.g., other UEs).

As indicated above, FIG. 8 is provided as an example. Other examples may differ from what is described with respect to FIG. 8.

Figure 9:
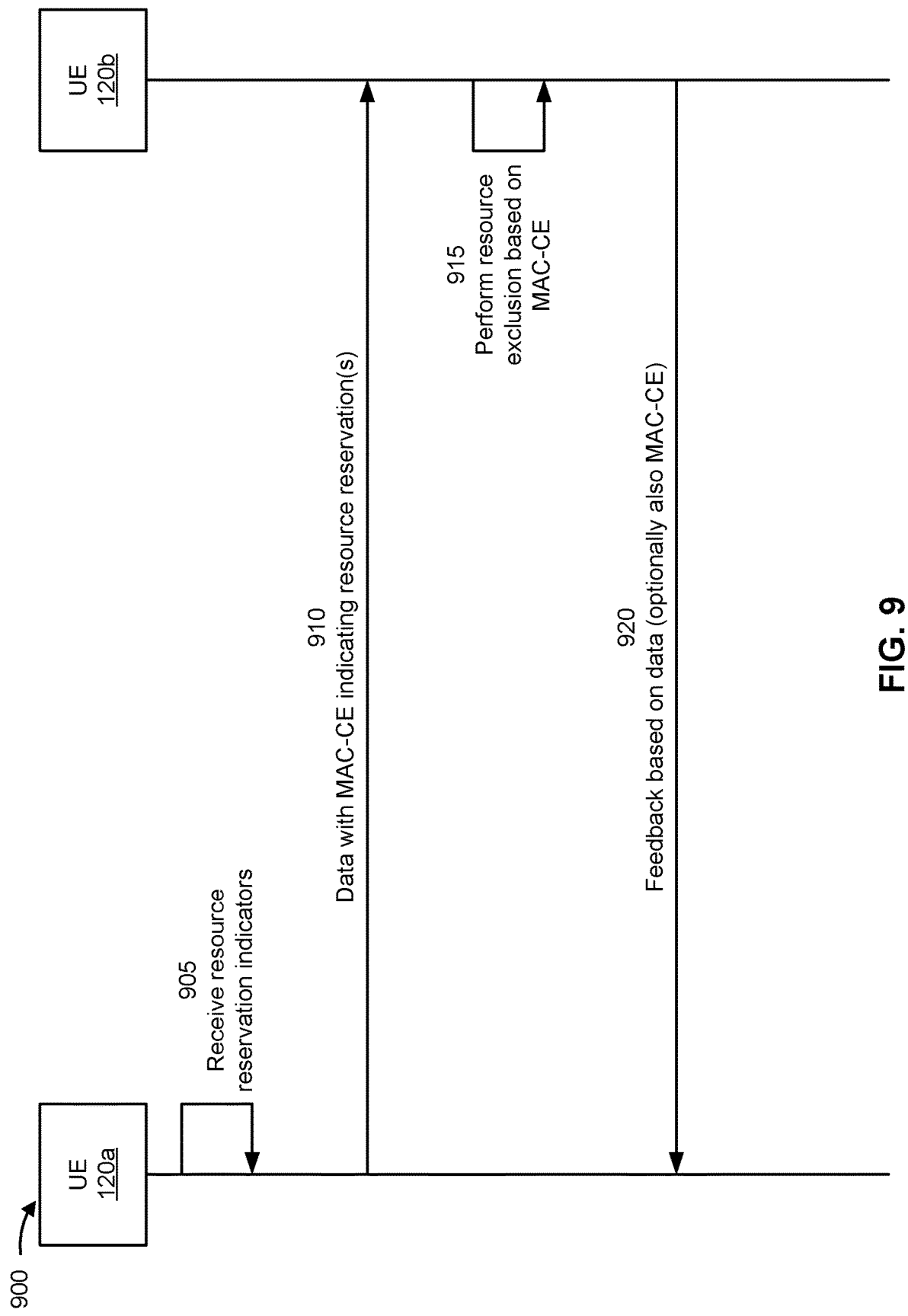
FIG. 9 is a diagram illustrating an example associated with transmitting and receiving resource reservation information with data, in accordance with the present disclosure.

FIG. 9 is a diagram illustrating an example 900 associated with transmitting and receiving resource reservation information with data, in accordance with the present disclosure. As shown in FIG. 9, a UE 120a and a UE 120b may communicate with one another (e.g., on a sidelink channel, as described in connection with FIG. 3 and/or FIG. 4).

As shown by reference number 905, the first UE 120a may receive, from one or more additional UEs, one or more indicators corresponding to one or more resource reservations. For example, the first UE 120a may receive SCI and/or inter-UE coordination messages indicating the resource reservation(s).

As shown by reference number 910, the first UE 120a may transmit, and the second UE 120b may receive, data, as well as at least one resource reservation (e.g., as indicated by the messages that the first UE 120a received, as described in connection with reference number 905) that is indicated within a control element (e.g., a MAC-CE) with the data. For example, the first UE 120a may determine a size for the MAC-CE, as described in connection with FIG. 6, and encode the MAC-CE with the data. In some aspects, the MAC-CE may additionally indicate a resource reservation associated with a MAC layer of the first UE 120a. Accordingly, the first UE 120a may forward indicators of resource reservations received from the additional UE(s) as well as transmit an indicator of a resource reservation for the first UE 120a.

In some aspects, the MAC-CE may further indicate whether the first UE 120a intends to receive a signal associated with the at least one resource reservation. For example, the first UE 120a may include a bit (e.g., set to "1" or "TRUE") when the resource reservation associated with the bit is associated with a signal that the first UE 120a intends to receive. Additionally, or alternatively, the MAC-CE may further indicate measurements of signal strength (e.g., RSRP values) and/or quality (e.g., RSRQ values) associated with the at least one resource reservation. Additionally, or alternatively, the MAC-CE may further indicate distances associated with the additional UE(s) from which the first UE 120a received the at least one resource reservation (e.g., a distance associated with the MAC layer of the first UE 120a may be zero). Additionally, or alternatively, the MAC-CE may further indicate identification information associated with the additional UE(s) (e.g., UE IDs, destination IDs, source IDs, zone IDs, and/or other IDs).

In some aspects, the first UE 120a may determine whether to include a bitmap (e.g., as described in connection with FIG. 8) or a list (e.g., as described in connection with FIG. 7) in the control element. In some aspects, selection between a bitmap or a list may be programmed (and/or otherwise preconfigured) in the memory of the UE 120a (e.g., according to 3GPP specifications and/or another standard). Additionally, or alternatively, selection between a bitmap or a list may be indicated by a base station (e.g., base station 110, via an RRC configuration).

As an alternative, the first UE 120a may dynamically determine whether to include a bitmap (e.g., as described in connection with FIG. 8) or a list (e.g., as described in connection with FIG. 7) in the control element. For example, the first UE 120a may perform the determination based at least in part on whether the at least one resource reservation is periodic or aperiodic. For example, the first UE 120a may use a list for periodic reservations and a bitmap for aperiodic reservations.

Additionally, or alternatively, the first UE 120a may perform the determination based at least in part on a size of the control element. For example, the first UE 120a may use a bitmap for a smaller size (e.g., not satisfying a size threshold) and a list for a larger size (e.g., satisfying a size threshold).

In some aspects, the second UE 120b may receive the data and decode the control element only when the second UE 120b is an intended recipient of the data. As an alternative, the second UE 120b may always decode the control element even when the second UE 120b is not an intended recipient of the data. For example, the first UE 120a may transmit, and the second UE 120b may receive, SCI associated with the data. Accordingly, in some aspects, the first UE 120a may include at least one bit in the SCI indicating that the control element will be transmitted with the data such that the second UE 120b is aware that the control element should be decoded.

In another example, the first UE 120a may include at least one bit in the SCI indicating that the control element will be transmitted with the data along with an indication of a cast type (e.g., unicast, multicast, or broadcast). In some aspects, the first UE 120a may indicate that the control element will be transmitted with the data in SCI-1 and indicate the cast type in SCI-2. Accordingly, the second UE 120b decodes the control element based at least in part on the cast type. The second UE 120b may decode a unicast control element when the second UE 120b is an intended recipient, may decode a multicast control element when the second UE 120b is included a group of UEs receiving the multicast, and may always decode a broadcast control element.

As shown by reference number 915, the second UE 120b may perform resource exclusion using the at least one resource reservation (e.g., for a transmission to another UE and/or to the first UE 120*a*). The second UE 120*b* may perform resource exclusion as described in connection with FIG. 4.

In some aspects, the at least one resource reservation may be associated with a signal that the second UE 120*b* intends to receive (e.g., as indicated by the MAC-CE, as described above). Accordingly, the second UE 120*b* may perform resource exclusion based at least in part on a signal strength (e.g., an RSRP value) of SCI associated with the control element (e.g., as measured by the second UE 120*b*). In some aspects, the resource exclusion may be further based at least in part on applying an increment to the signal strength value. For example, the second UE 120*b* may apply a higher value of resource exclusion RSRP when determining a candidate resource set for transmission because the second UE 120*b* intends to receive the signal associated with the at least one resource reservation. In some aspects, the increment to signal strength applied for resource exclusion may be a programmed (and/or otherwise preconfigured) value stored in the memory of the UE 120*b* (e.g., according to 3GPP specifications and/or another standard). Additionally, or alternatively, the increment may be indicated by a base station (e.g., base station 110, via an RRC configuration). In a combinatory example, the base station 110 may indicate a value to use for the signal strength increment from a plurality of possible values stored in the memory of the UE 120*b* (e.g., according to 3GPP specifications and/or another standard).

In some aspects, the increment to the signal strength is based at least in part on a priority associated with the at least one resource reservation. For example, for some high priority values (e.g., satisfying a priority threshold), the second UE 120*b* may perform resource exclusion with an increment set to infinity.

Additionally, or alternatively, the at least one resource reservation may be associated with a signal that the first UE 120*a* intends to receive (e.g., as indicated by the MAC-CE, as described above). Accordingly, the second UE 120*b* may perform resource exclusion based at least in part on a reported signal strength (e.g., an RSRP value) associated with the at least one resource reservation (e.g., indicated in the MAC-CE, as described above). Additionally, or alternatively, the second UE 120*b* may perform resource exclusion based at least in part on a historical signal strength (e.g., associated with the first UE 120*a* and/or with a UE associated with the at least one resource reservation as indicated in the MAC-CE, as described above). Additionally, or alternatively, the second UE 120*b* may perform resource exclusion based at least in part on a default value. In some aspects, the default value may be a programmed (and/or otherwise preconfigured) value stored in the memory of the UE 120*b* (e.g., according to 3GPP specifications and/or another standard). Additionally, or alternatively, the default value may be indicated by a base station (e.g., base station 110, via an RRC configuration). In a combinatory example, the base station 110 may indicate a value to use for the default value from a plurality of possible values stored in the memory of the UE 120*b* (e.g., according to 3GPP specifications and/or another standard).

In some aspects, the UE 120*b* may determine the default value based at least in part on a priority associated with the at least one resource reservation. For example, the default value may be higher when the priority is higher. In some aspects, the UE 120 may be programmed (and/or otherwise preconfigured) with a table, a formula, and/or another algorithm in the memory of the UE 120*b* (e.g., according to 3GPP specifications and/or another standard), where the algorithm accepts the priority as input and outputs the default value to use. Additionally, or alternatively, the algorithm may be indicated by a base station (e.g., base station 110, via an RRC configuration). For example, the base station 110 may indicate an algorithm to use from a plurality of possible algorithms stored in the memory of the UE 120*b* (e.g., according to 3GPP specifications and/or another standard).

In some aspects, the at least one resource reservation may be associated with a signal that neither the first UE 120*a* nor the second UE 120*b* intends to receive. Accordingly, the second UE 120*b* may perform resource exclusion based at least in part on a default value. The default value may be smaller than a default value associated with resource exclusion for a resource reservation association with a signal that the first UE 120*a* intends to receive, as described above. In some aspects, the default value may be a programmed (and/or otherwise preconfigured) value stored in the memory of the UE 120*b* (e.g., according to 3GPP specifications and/or another standard). Additionally, or alternatively, the default value may be indicated by a base station (e.g., base station 110, via an RRC configuration). In a combinatory example, the base station 110 may indicate a value to use for the default value from a plurality of possible values stored in the memory of the UE 120*b* (e.g., according to 3GPP specifications and/or another standard).

In some aspects, the UE 120*b* may determine the default value based at least in part on a priority associated with the at least one resource reservation. For example, the default value may be higher when the priority is higher. In some aspects, the UE 120*b* may be programmed (and/or otherwise preconfigured) with a table, a formula, and/or another algorithm in the memory of the UE 120 (e.g., according to 3GPP specifications and/or another standard), where the algorithm accepts the priority as input and outputs the default value to use. Additionally, or alternatively, the algorithm may be indicated by a base station (e.g., base station 110, via an RRC configuration). For example, the base station 110 may indicate an algorithm to use from a plurality of possible algorithms stored in the memory of the UE 120*b* (e.g., according to 3GPP specifications and/or another standard).

In some aspects, the at least one resource reservation may be associated with a resource that the second UE 120*b* intended to use to transmit to the first UE 120*a*. Accordingly, the second UE 120*b* may exclude a full slot associated with the at least one resource reservation. In some aspects, the second UE 120*b* may exclude the full slot based at least in part on a reported signal strength (e.g., an RSRP value) associated with the at least one resource reservation (e.g., as indicated in the MAC-CE, as described above) satisfying a signal strength threshold.

As shown by reference number 920, the second UE 120*b* may transmit, and the first UE 120*a* may receive, feedback associated with the data and not associated with the control element. For example, the second UE 120*b* may transmit HARQ feedback indicating whether the data was successfully received and decoded regardless of whether the control element was successfully received and decoded. As an alternative, the second UE 120*b* may transmit, and the first UE 120*a* may receive, feedback associated with the data and the control element. For example, the second UE 120*b* may transmit HARQ feedback indicating whether both the data and the control element were successfully received and decoded.

By using techniques as described in connection with FIG. 9, the first UE 120*a* transmits resource reservation information in a MAC-CE with data. As a result, the first UE 120*a* conserves network resources and reduces congestion and interference to nearby devices (e.g., other UEs). Additionally, in some aspects, the second UE 120*b* selectively decodes the MAC-CE based on cast type in order to conserve power and processing resources. In some aspects, the second UE 120*b* applies resource exclusion based at least in part on the MAC-CE in order to increase chances of successful reception of a signal at the first UE 120*a* and/or the second UE 120*b*, which conserves power and processing resources.

As indicated above, FIG. 9 is provided as an example. Other examples may differ from what is described with respect to FIG. 9.

Figure 10:
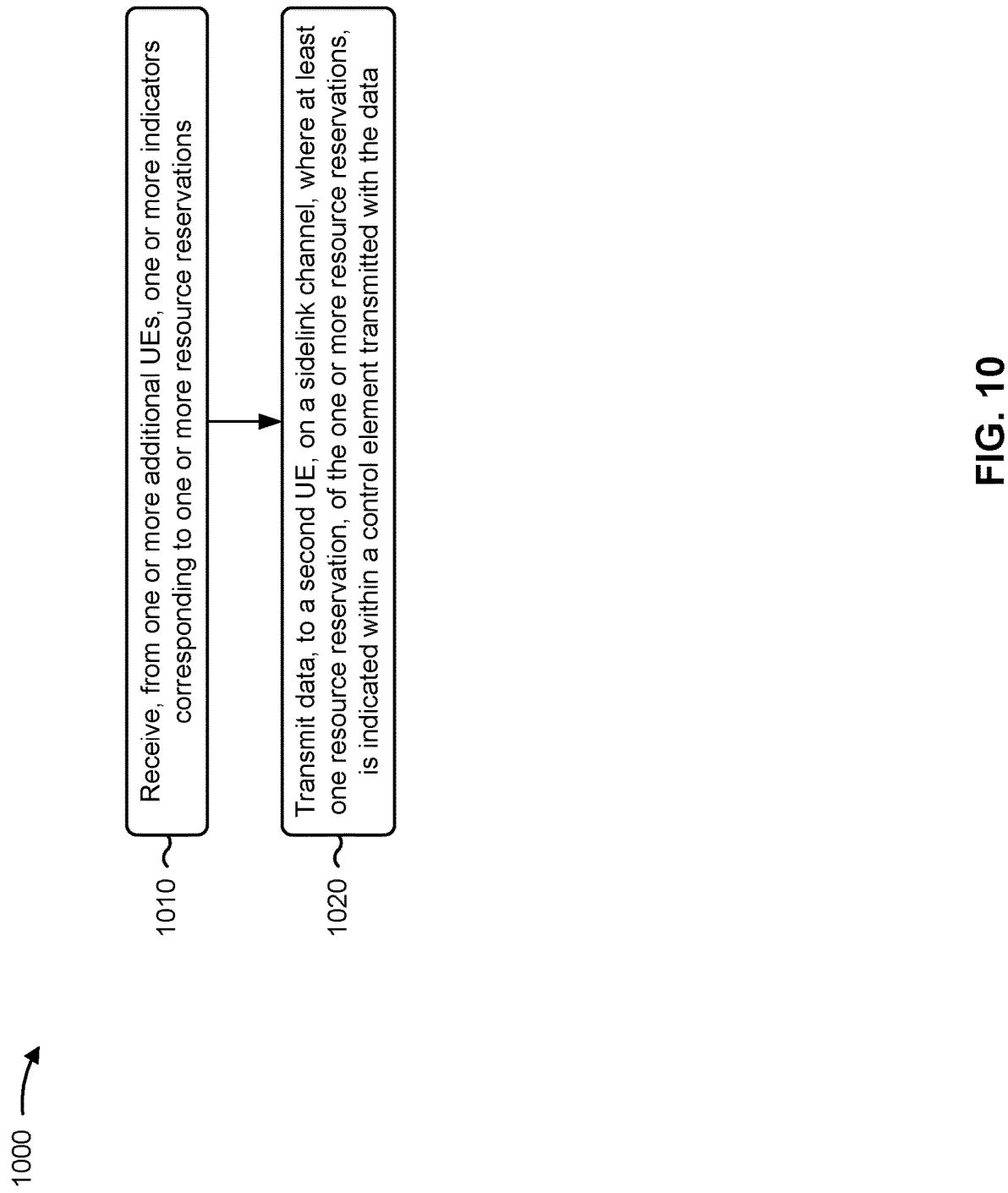
FIGS. 10 and 11 are diagrams illustrating example processes associated with transmitting and receiving resource reservation information with data, in accordance with the present disclosure.

FIG. 10 is a diagram illustrating an example process 1000 performed, for example, by a first UE, in accordance with the present disclosure. Example process 1000 is an example where the UE (e.g., UE 120*a* and/or apparatus 1200 of FIG. 12) performs operations associated with sharing resource reservation information with data.

As shown in FIG. 10, in some aspects, process 1000 may include receiving, from one or more additional UEs, one or more indicators corresponding to one or more resource reservations (block 1010). For example, the UE (e.g., using communication manager 140 and/or reception component 1202, depicted in FIG. 12) may receive, from one or more additional UEs, one or more indicators corresponding to one or more resource reservations, as described herein.

As further shown in FIG. 10, in some aspects, process 1000 may include transmitting data, to a second UE (e.g., UE 120*b* and/or apparatus 1200 of FIG. 12), on a sidelink channel (block 1020). For example, the UE (e.g., using communication manager 140 and/or transmission component 1204, depicted in FIG. 12) may transmit data, to a second UE, on a sidelink channel, as described herein. At least one resource reservation, of the one or more resource reservations, may be indicated within a control element transmitted with the data.

Process 1000 may include additional aspects, such as any single aspect or any combination of aspects described below and/or in connection with one or more other processes described elsewhere herein.

Figure 12:
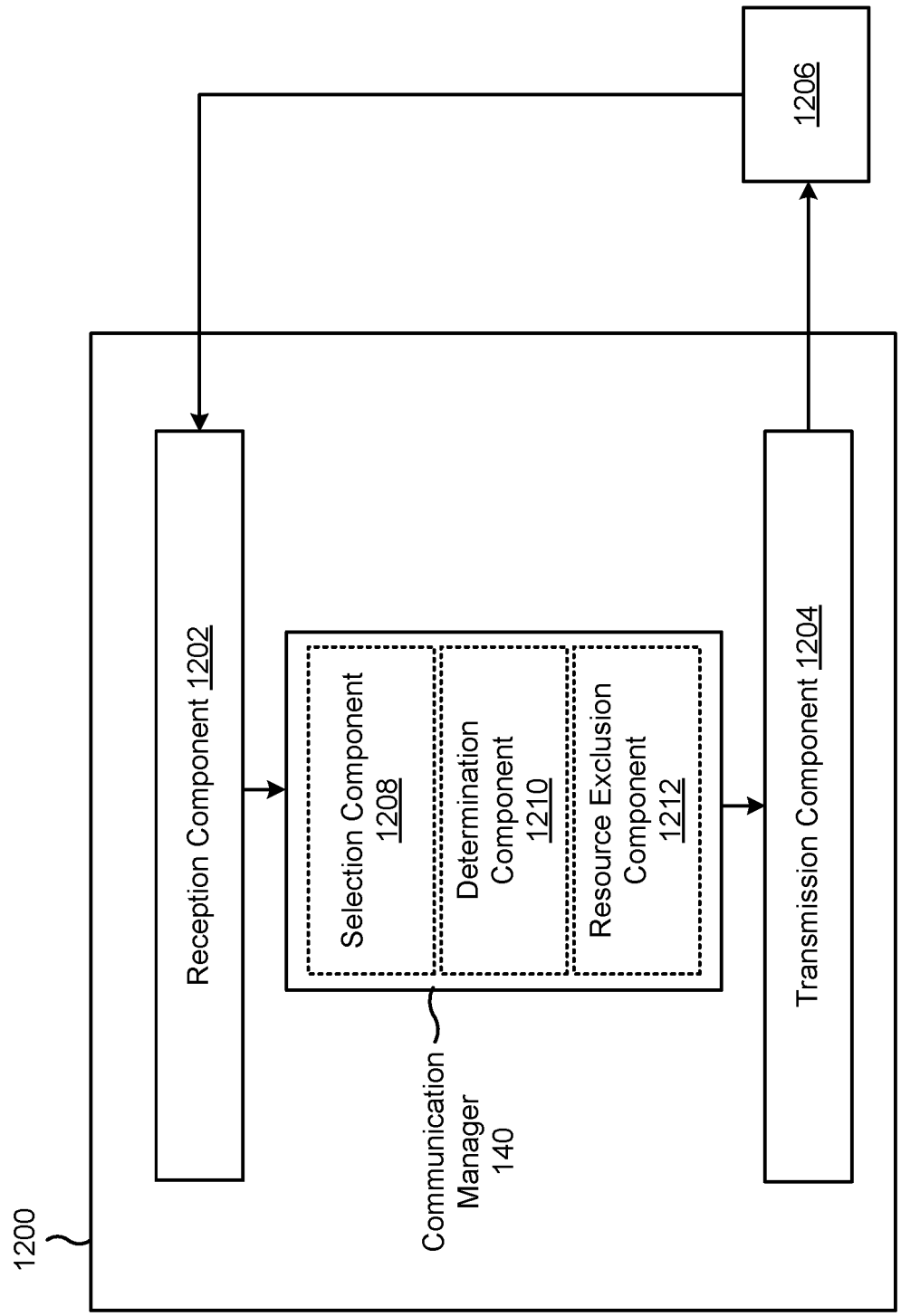
FIG. 12 is a diagram of an example apparatus for wireless communication, in accordance with the present disclosure.

In a first aspect, process 1000 further includes selecting resources (e.g., using communication manager 140 and/or selection component 1208, depicted in FIG. 12) for transmitting the data before encoding the control element.

In a second aspect, alone or in combination with the first aspect, a size of the control element is based at least in part on a minimum size.

In a third aspect, alone or in combination with one or more of the first and second aspects, the minimum size is a quantity of bits associated with indicating a single resource reservation.

In a fourth aspect, alone or in combination with one or more of the first through third aspects, the minimum size is a quantity of bits associated with a bitmap used to indicate the at least one of the one or more resource reservations.

In a fifth aspect, alone or in combination with one or more of the first through fourth aspects, a size of the control element is based at least in part on a maximum size.

In a sixth aspect, alone or in combination with one or more of the first through fifth aspects, a size of the control element is based at least in part on a maximum MCS increase.

In a seventh aspect, alone or in combination with one or more of the first through sixth aspects, the maximum MCS increase is based at least in part on a priority associated with the data.

In an eighth aspect, alone or in combination with one or more of the first through seventh aspects, the maximum MCS increase is based at least in part on a retransmission count associated with the data.

In a ninth aspect, alone or in combination with one or more of the first through eighth aspects, the maximum MCS increase is based at least in part on whether a resource reservation for the data has been indicated in a previous transmission.

In a tenth aspect, alone or in combination with one or more of the first through ninth aspects, process 1000 further includes transmitting (e.g., using communication manager 140 and/or transmission component 1204) SCI associated with the data that includes at least one bit indicating that the control element will be transmitted with the data.

In an eleventh aspect, alone or in combination with one or more of the first through tenth aspects, process 1000 further includes transmitting (e.g., using communication manager 140 and/or transmission component 1204) SCI associated with the data that indicates that the control element will be transmitted with the data and indicates a cast type associated with the control element.

In a twelfth aspect, alone or in combination with one or more of the first through eleventh aspects, process 1000 further includes transmitting (e.g., using communication manager 140 and/or transmission component 1204) SCI-1 associated with the data that indicates that the control element will be transmitted with the data, and transmitting (e.g., using communication manager 140 and/or transmission component 1204) SCI-2 associated with the data that indicates a cast type associated with the control element.

In a thirteenth aspect, alone or in combination with one or more of the first through twelfth aspects, process 1000 further includes receiving (e.g., using communication manager 140 and/or reception component 1202), from the second UE, feedback associated with the data and not associated with the control element.

In a fourteenth aspect, alone or in combination with one or more of the first through thirteenth aspects, process 1000 further includes receiving (e.g., using communication manager 140 and/or reception component 1202), from the second UE, feedback associated with the data and the control element.

In a fifteenth aspect, alone or in combination with one or more of the first through fourteenth aspects, the one or more resource reservations include a plurality of resource reservations, and the control element includes a list selected from the plurality of resource reservations based at least in part on times associated with the plurality of resource reservations, signaling strengths or qualities associated with indicators of the plurality of resource reservations, distances between the first UE and the one or more additional UEs associated with the plurality of resource reservations, or a combination thereof.

In a sixteenth aspect, alone or in combination with one or more of the first through fifteenth aspects, the list selected from the plurality of resource reservations is further based at least in part on whether the first UE is an intended recipient of a signal associated with one or more of the plurality of resource reservations, hopping counts associated with indicators of the plurality of resource reservations, periodicities associated with the plurality of resource reservations, or a combination thereof.

In a seventeenth aspect, alone or in combination with one or more of the first through sixteenth aspects, the control element further indicates whether the first UE intends to receive a signal associated with one or more of the plurality of resource reservations, measurements of signal strength or quality associated with the plurality of resource reservations, distances associated with the one or more additional UEs, identification information associated with the one or more additional UEs, or a combination thereof.

In an eighteenth aspect, alone or in combination with one or more of the first through seventeenth aspects, one or more resource reservations include a resource reservation associated with a MAC layer of the first UE.

In a nineteenth aspect, alone or in combination with one or more of the first through eighteenth aspects, the control element includes a bitmap indicating the at least one resource reservation of the one or more resource reservations.

In a twentieth aspect, alone or in combination with one or more of the first through nineteenth aspects, the bitmap is based at least in part on a fixed bit size associated with the bitmap.

In a twenty-first aspect, alone or in combination with one or more of the first through twentieth aspects, the fixed bit size is based at least in part on a quantity of subchannels and a quantity of slots.

In a twenty-second aspect, alone or in combination with one or more of the first through twenty-first aspects, the bitmap is based at least in part on a size associated with the control element.

In a twenty-third aspect, alone or in combination with one or more of the first through twenty-second aspects, a quantity of slots indicated in the bitmap is based at least in part on the size associated with the control element.

In a twenty-fourth aspect, alone or in combination with one or more of the first through twenty-third aspects, the bitmap is associated with one or more first periodicities, and the control element further includes at least one additional bitmap associated with one or more second periodicities.

In a twenty-fifth aspect, alone or in combination with one or more of the first through twenty-fourth aspects, the bitmap is associated with a first periodicity, associated with the one or more resource reservations, that is smaller than a second periodicity associated with the one or more resource reservations.

In a twenty-sixth aspect, alone or in combination with one or more of the first through twenty-fifth aspects, the bitmap is associated with a first priority, associated with the one or more resource reservations, that is higher than a second priority associated with the one or more resource reservations.

In a twenty-seventh aspect, alone or in combination with one or more of the first through twenty-sixth aspects, the bitmap is associated with a first periodicity, associated with the one or more resource reservations, and a second, smaller periodicity associated with the one or more resource reservations.

In a twenty-eighth aspect, alone or in combination with one or more of the first through twenty-seventh aspects, the bitmap is associated with a starting slot, a subframe index, or a combination thereof.

In a twenty-ninth aspect, alone or in combination with one or more of the first through twenty-eighth aspects, process 1000 further includes determining (e.g., using communication manager 140 and/or determination component 1210, depicted in FIG. 12) whether to include a bitmap or a list in the control element.

In a thirtieth aspect, alone or in combination with one or more of the first through twenty-ninth aspects, the determining is based at least in part on whether the at least one resource reservation of the one or more resource reservations is periodic or aperiodic.

In a thirty-first aspect, alone or in combination with one or more of the first through thirtieth aspects, the determining is based at least in part on a size of the control element.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
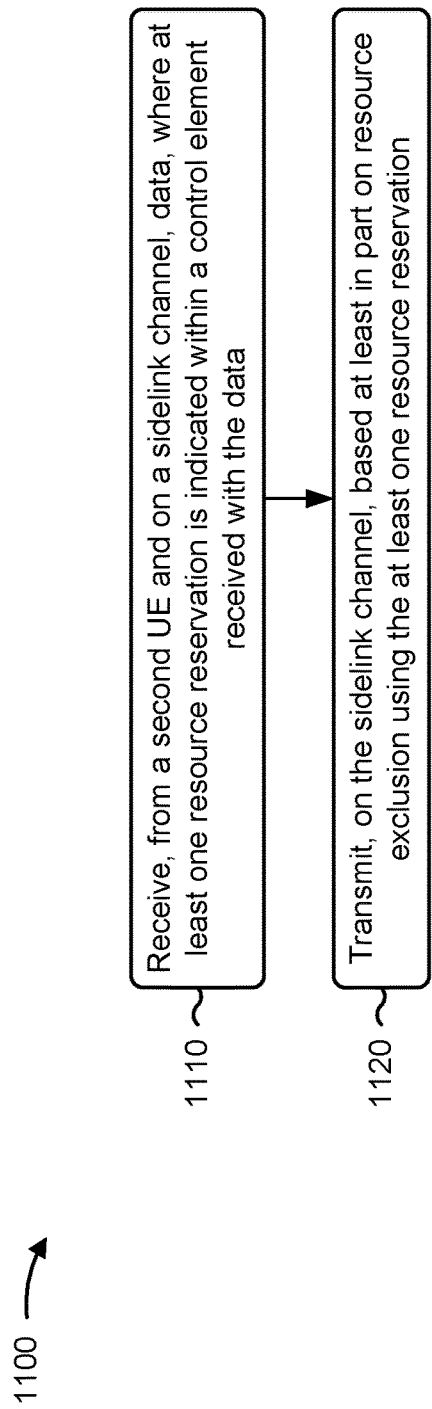

FIG. 11 is a diagram illustrating an example process 1100 performed, for example, by a first UE, in accordance with the present disclosure. Example process 1100 is an example where the UE (e.g., UE 120*b* and/or apparatus 1200 of FIG. 12) performs operations associated with receiving resource reservation information with data.

As shown in FIG. 11, in some aspects, process 1100 may include receiving, from a second UE (e.g., UE 120*a* and/or apparatus 1200 of FIG. 12) and on a sidelink channel, data (block 1110). For example, the UE (e.g., using communication manager 140 and/or reception component 1202, depicted in FIG. 12) may receive, from a second UE and on a sidelink channel, data, as described herein. At least one resource reservation may be indicated within a control element received with the data.

As further shown in FIG. 11, in some aspects, process 1100 may include transmitting, on the sidelink channel, based at least in part on resource exclusion using the at least one resource reservation (block 1120). For example, the UE (e.g., using communication manager 140 and/or transmission component 1204, depicted in FIG. 1) may transmit, on the sidelink channel, based at least in part on resource exclusion using the at least one resource reservation, as described herein.

Process 1100 may include additional aspects, such as any single aspect or any combination of aspects described below and/or in connection with one or more other processes described elsewhere herein.

In a first aspect, the control element is decoded based at least in part on the first UE being an intended receiver of the data.

In a second aspect, alone or in combination with the first aspect, process 1100 further includes receiving (e.g., using communication manager 140 and/or reception component 1202) SCI associated with the data that includes at least one bit indicating that the control element will be transmitted with the data.

In a third aspect, alone or in combination with one or more of the first and second aspects, process 1100 further includes receiving (e.g., using communication manager 140 and/or reception component 1202) SCI associated with the data that indicates that the control element will be transmitted with the data and indicates a cast type associated with the control element, such that the control element is decoded based at least in part on the cast type.

In a fourth aspect, alone or in combination with one or more of the first through third aspects, process 1100 further includes receiving (e.g., using communication manager 140 and/or reception component 1202) SCI-1 associated with the data that indicates that the control element will be transmitted with the data, and receiving (e.g., using communication manager 140 and/or reception component 1202, depicted in FIG. 12) SCI-2 associated with the data that indicates a cast type associated with the control element, such that the control element is decoded based at least in part on the cast type.

In a fifth aspect, alone or in combination with one or more of the first through fourth aspects, process 1100 further includes transmitting (e.g., using communication manager 140 and/or transmission component 1204), to the second UE, feedback associated with the data and not associated with the control element.

In a sixth aspect, alone or in combination with one or more of the first through fifth aspects, process 1100 further includes transmitting (e.g., using communication manager 140 and/or transmission component 1204), to the second UE, feedback associated with the data and the control element.

In a seventh aspect, alone or in combination with one or more of the first through sixth aspects, the at least one resource reservation is associated with a signal that the first UE intends to receive.

In an eighth aspect, alone or in combination with one or more of the first through seventh aspects, the resource exclusion is based at least in part on a signal strength of SCI associated with the control element.

In a ninth aspect, alone or in combination with one or more of the first through eighth aspects, the resource exclusion is based at least in part on a signal strength increment.

In a tenth aspect, alone or in combination with one or more of the first through ninth aspects, the signal strength increment is based at least in part on a priority associated with the at least one resource reservation.

In an eleventh aspect, alone or in combination with one or more of the first through tenth aspects, the at least one resource reservation is associated with a signal that the second UE intends to receive.

In a twelfth aspect, alone or in combination with one or more of the first through eleventh aspects, the resource exclusion is based at least in part on a reported signal strength associated with the at least one resource reservation.

In a thirteenth aspect, alone or in combination with one or more of the first through twelfth aspects, the resource exclusion is based at least in part on a historical signal strength.

In a fourteenth aspect, alone or in combination with one or more of the first through thirteenth aspects, the resource exclusion is based at least in part on a default value.

In a fifteenth aspect, alone or in combination with one or more of the first through fourteenth aspects, the default value is based at least in part on a priority associated with the at least one resource reservation.

In a sixteenth aspect, alone or in combination with one or more of the first through fifteenth aspects, the at least one resource reservation is associated with a signal that neither the first UE nor the second UE intends to receive.

In a seventeenth aspect, alone or in combination with one or more of the first through sixteenth aspects, the at least one resource reservation is associated with a resource that the first UE intended to use to transmit to the second UE, and the resource exclusion includes a full slot associated with the at least one resource reservation.

In an eighteenth aspect, alone or in combination with one or more of the first through seventeenth aspects, the resource exclusion is based at least in part on a reported signal strength associated with the at least one resource reservation satisfying a threshold.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of a selection component 1208, a determination component 1210, or a resource exclusion component 1212, among other examples.

In some aspects, the apparatus 1200 may be configured to perform one or more operations described herein in connection with FIGS. 5-9. Additionally, or alternatively, the apparatus 1200 may be configured to perform one or more processes described herein, such as process 1000 of FIG. 10, process 1100 of FIG. 11, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

In some aspects, the apparatus 1200 may be a transmitting UE on a sidelink channel. Accordingly, the reception component 1202 may receive (e.g., from one or more additional UEs) one or more indicators corresponding to one or more resource reservations, and the transmission component 1204 may transmit data (e.g., to a receiving UE on the sidelink channel, such as apparatus 1206) along with at least one resource reservation, of the one or more resource reservations, indicated within a control element transmitted with the data.

In some aspects, the selection component 1208 may select resources for transmitting the data before encoding the control element. The selection component 1208 may include a modem, a modulator, a transmit MIMO processor, a transmit processor, a controller/processor, a memory, or a combination thereof, of the UE described in connection with FIG. 2.

In some aspects, the transmission component 1204 may transmit SCI associated with the data that includes at least one bit indicating that the control element will be transmitted with the data. In some aspects, the transmission component 1204 may transmit SCI associated with the data that indicates that the control element will be transmitted with the data and indicates a cast type associated with the control element. In some aspects, the transmission component 1204 may transmit SCI-1 associated with the data that indicates that the control element will be transmitted with the data and transmit SCI-2 associated with the data that indicates a cast type associated with the control element.

In some aspects, the reception component 1202 may receive (e.g., from the receiving UE) feedback associated with the data and not associated with the control element. As an alternative, the reception component 1202 may receive (e.g., from the receiving UE) feedback associated with the data and the control element.

In some aspects, the determination component 1210 may determine whether to include a bitmap or a list in the control element. The determination component 1210 may include a modem, a modulator, a transmit MIMO processor, a transmit processor, a controller/processor, a memory, or a combination thereof, of the UE described in connection with FIG. 2.

As an alternative, the apparatus 1200 may be a receiving UE on a sidelink channel. Accordingly, the reception component 1202 may receive (e.g., from a transmitting UE, such as apparatus 1206, on the sidelink channel) data along with at least one resource reservation indicated within a control element received with the data. Accordingly, the transmission component 1204 may transmit, on the sidelink channel, based at least in part on resource exclusion using the at least one resource reservation. For example, the resource exclusion component 1212 may perform resource exclusion as described in connection with FIG. 4 and/or FIG. 9. The resource exclusion component 1212 may include a modem, a modulator, a transmit MIMO processor, a transmit processor, a controller/processor, a memory, or a combination thereof, of the UE described in connection with FIG. 2.

In some aspects, the reception component 1202 may receive SCI associated with the data that includes at least one bit indicating that the control element will be transmitted with the data. In some aspects, the reception component 1202 may receive SCI associated with the data that indicates that the control element will be transmitted with the data and indicates a cast type associated with the control element, such that the reception component 1202 decodes the control element based at least in part on the cast type. In some aspects, the reception component 1202 may receive SCI-1 associated with the data that indicates that the control element will be transmitted with the data and SCI-2 associated with the data that indicates a cast type associated with the control element, such that the reception component 1202 decodes the control element based at least in part on the cast type.

In some aspects, the transmission component 1204 may transmit (e.g., to the transmitting UE) feedback associated with the data and not associated with the control element. As an alternative, the transmission component 1204 may transmit (e.g., to the transmitting UE) feedback associated with the data and the control element.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a first user equipment (UE), comprising: receiving, from one or more additional UEs, one or more indicators corresponding to one or more resource reservations; and transmitting data, to a second UE, on a sidelink channel, wherein at least one resource reservation, of the one or more resource reservations, is indicated within a control element transmitted with the data.

Aspect 2: The method of Aspect 1, further comprising: selecting resources for transmitting the data before encoding the control element.

Aspect 3: The method of any of Aspects 1 through 2, wherein a size of the control element is based at least in part on a minimum size.

Aspect 4: The method of Aspect 3, wherein the minimum size is a quantity of bits associated with indicating a single resource reservation.

Aspect 5: The method of Aspect 3, wherein the minimum size is a quantity of bits associated with a bitmap used to indicate the at least one of the one or more resource reservations.

Aspect 6: The method of any of Aspects 1 through 5, wherein a size of the control element is based at least in part on a maximum size.

Aspect 7: The method of any of Aspects 1 through 6, wherein a size of the control element is based at least in part on a maximum modulation and coding scheme (MCS) increase.

Aspect 8: The method of Aspect 7, wherein the maximum MCS increase is based at least in part on a priority associated with the data.

Aspect 9: The method of any of Aspects 7 through 8, wherein the maximum MCS increase is based at least in part on a retransmission count associated with the data.

Aspect 10: The method of any of Aspects 7 through 9, wherein the maximum MCS increase is based at least in part on whether a resource reservation for the data has been indicated in a previous transmission.

Aspect 11: The method of any of Aspects 1 through 10, further comprising: transmitting sidelink control information (SCI) associated with the data that includes at least one bit indicating that the control element will be transmitted with the data.

Aspect 12: The method of any of Aspects 1 through 10, further comprising: transmitting sidelink control information (SCI) associated with the data that indicates that the control element will be transmitted with the data and indicates a cast type associated with the control element.

Aspect 13: The method of any of Aspects 1 through 10, further comprising: transmitting first stage sidelink control information (SCI-1) associated with the data that indicates that the control element will be transmitted with the data; and transmitting second stage sidelink control information (SCI-2) associated with the data that indicates a cast type associated with the control element.

Aspect 14: The method of any of Aspects 1 through 13, further comprising: receiving, from the second UE, feedback associated with the data and not associated with the control element.

Aspect 15: The method of any of Aspects 1 through 13, further comprising: receiving, from the second UE, feedback associated with the data and the control element.

Aspect 16: The method of any of Aspects 1 through 15, wherein one or more resource reservations include a resource reservation associated with a medium access control (MAC) layer of the first UE.

Aspect 17: The method of any of Aspects 1 through 16, wherein the one or more resource reservations include a plurality of resource reservations, and the control element includes a list selected from the plurality of resource reservations based at least in part on: times associated with the plurality of resource reservations; signal strengths or qualities associated with indicators of the plurality of resource reservations; distances between the first UE and the one or more additional UEs associated with the plurality of resource reservations; or a combination thereof.

Aspect 18: The method of Aspect 17, wherein the list selected from the plurality of resource reservations is further based at least in part on: whether the first UE is an intended recipient of a signal associated with one or more of the plurality of resource reservations; hop counts associated with indicators of the plurality of resource reservations; periodicities associated with the plurality of resource reservations; or a combination thereof.

Aspect 19: The method of any of Aspects 17 through 18, wherein the control element further indicates: whether the first UE intends to receive a signal associated with one or more of the plurality of resource reservations; measurements of signal strength or quality associated with the plurality of resource reservations; distances associated with the one or more additional UEs; identification information associated with the one or more additional UEs; or a combination thereof.

Aspect 20: The method of any of Aspects 1 through 16, wherein the control element includes a bitmap indicating the at least one resource reservation of the one or more resource reservations.

Aspect 21: The method of Aspect 20, wherein the bitmap is based at least in part on a fixed bit size associated with the bitmap.

Aspect 22: The method of Aspect 21, wherein the fixed bit size is based at least in part on a quantity of subchannels and a quantity of slots.

Aspect 23: The method of Aspect 20, wherein the bitmap is based at least in part on a size associated with the control element.

Aspect 24: The method of Aspect 23, wherein a quantity of slots indicated in the bitmap is based at least in part on the size associated with the control element.

Aspect 25: The method of any of Aspects 20 through 24, wherein the bitmap is associated with one or more first periodicities, and the control element further includes at least one additional bitmap associated with one or more second periodicities.

Aspect 26: The method of any of Aspects 20 through 24, wherein the bitmap is associated with a first periodicity, associated with the one or more resource reservations, that is smaller than a second periodicity associated with the one or more resource reservations.

Aspect 27: The method of any of Aspects 20 through 26, wherein the bitmap is associated with a first priority, associated with the one or more resource reservations, that is higher than a second priority associated with the one or more resource reservations.

Aspect 28: The method of any of Aspects 20 through 24, wherein the bitmap is associated with a first periodicity, associated with the one or more resource reservations, and a second, smaller periodicity associated with the one or more resource reservations.

Aspect 29: The method of any of Aspects 20 through 28, wherein the bitmap is associated with a starting slot, a subframe index, or a combination thereof.

Aspect 30: The method of any of Aspects 1 through 29, further comprising: determining whether to include a bitmap or a list in the control element.

Aspect 31: The method of Aspect 30, wherein the determining is based at least in part on whether the at least one resource reservation of the one or more resource reservations is periodic or aperiodic.

Aspect 32: The method of any of Aspects 30 through 31, wherein the determining is based at least in part on a size of the control element.

Aspect 33: A method of wireless communication performed by a first user equipment (UE), comprising: receiving, from a second UE and on a sidelink channel, data, wherein at least one resource reservation is indicated within a control element received with the data; and transmitting, on the sidelink channel, based at least in part on resource exclusion using the at least one resource reservation.

Aspect 34: The method of Aspect 33, wherein the control element is decoded based at least in part on the first UE being an intended receiver of the data.

Aspect 35: The method of any of Aspects 33 through 34, further comprising: receiving sidelink control information (SCI) associated with the data that includes at least one bit indicating that the control element will be transmitted with the data.

Aspect 36: The method of any of Aspects 33 through 34, further comprising: receiving sidelink control information (SCI) associated with the data that indicates that the control element will be transmitted with the data and indicates a cast type associated with the control element, wherein the control element is decoded based at least in part on the cast type.

Aspect 37: The method of any of Aspects 33 through 34, further comprising: receiving first stage sidelink control information (SCI-1) associated with the data that indicates that the control element will be transmitted with the data; and receiving second stage sidelink control information (SCI-2) associated with the data that indicates a cast type associated with the control element, wherein the control element is decoded based at least in part on the cast type.

Aspect 38: The method of any of Aspects 33 through 37, further comprising: transmitting, to the second UE, feedback associated with the data and not associated with the control element.

Aspect 39: The method of any of Aspects 33 through 37, further comprising: transmitting, to the second UE, feedback associated with the data and the control element.

Aspect 40: The method of any of Aspects 33 through 39, wherein the at least one resource reservation is associated with a signal that the first UE intends to receive.

Aspect 41: The method of Aspect 40, wherein the resource exclusion is based at least in part on a signal strength of sidelink control information (SCI) associated with the control element.

Aspect 42: The method of Aspect 41, wherein the resource exclusion is based at least in part on a signal strength increment.

Aspect 43: The method of Aspect 42, wherein the signal strength increment is based at least in part on a priority associated with the at least one resource reservation.

Aspect 44: The method of any of Aspects 33 through 43, wherein the at least one resource reservation is associated with a signal that the second UE intends to receive.

Aspect 45: The method of Aspect 44, wherein the resource exclusion is based at least in part on a reported signal strength associated with the at least one resource reservation.

Aspect 46: The method of Aspect 44, wherein the resource exclusion is based at least in part on a historical signal strength.

Aspect 47: The method of Aspect 44, wherein the resource exclusion is based at least in part on a default value.

Aspect 48: The method of Aspect 47, wherein the default value is based at least in part on a priority associated with the at least one resource reservation.

Aspect 49: The method of any of Aspects 33 through 39, wherein the at least one resource reservation is associated with a signal that neither the first UE nor the second UE intends to receive.

Aspect 50: The method of Aspect 49, wherein the resource exclusion is based at least in part on a default value.

Aspect 51: The method of Aspect 50, wherein the default value is based at least in part on a priority associated with the at least one resource reservation.

Aspect 52: The method of any of Aspects 33 through 39, wherein the at least one resource reservation is associated with a resource that the first UE intended to use to transmit to the second UE, and the resource exclusion includes a full slot associated with the at least one resource reservation.

Aspect 53: The method of Aspect 52, wherein the resource exclusion is based at least in part on a reported signal strength associated with the at least one resource reservation satisfying a threshold.

Aspect 54: An apparatus for wireless communication at a device, comprising a processor; memory coupled with the processor; and instructions stored in the memory and executable by the processor to cause the apparatus to perform the method of one or more of Aspects 1-32.

Aspect 55: A device for wireless communication, comprising a memory and one or more processors coupled to the memory, the one or more processors configured to perform the method of one or more of Aspects 1-32.

Aspect 56: An apparatus for wireless communication, comprising at least one means for performing the method of one or more of Aspects 1-32.

Aspect 57: A non-transitory computer-readable medium storing code for wireless communication, the code comprising instructions executable by a processor to perform the method of one or more of Aspects 1-32.

Aspect 58: A non-transitory computer-readable medium storing a set of instructions for wireless communication, the set of instructions comprising one or more instructions that, when executed by one or more processors of a device, cause the device to perform the method of one or more of Aspects 1-32.

Aspect 59: An apparatus for wireless communication at a device, comprising a processor; memory coupled with the processor; and instructions stored in the memory and executable by the processor to cause the apparatus to perform the method of one or more of Aspects 33-53.

Aspect 60: A device for wireless communication, comprising a memory and one or more processors coupled to the memory, the one or more processors configured to perform the method of one or more of Aspects 33-53.

Aspect 61: An apparatus for wireless communication, comprising at least one means for performing the method of one or more of Aspects 33-53.

Aspect 62: A non-transitory computer-readable medium storing code for wireless communication, the code comprising instructions executable by a processor to perform the method of one or more of Aspects 33-53.

Aspect 63: A non-transitory computer-readable medium storing a set of instructions for wireless communication, the set of instructions comprising one or more instructions that, when executed by one or more processors of a device, cause the device to perform the method of one or more of Aspects 33-53.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   a memory; and
   one or more processors, coupled to the memory, configured to:
   receive, from one or more additional UEs, one or more indicators corresponding to one or more resource reservations;
   transmit data, to a second UE, on a sidelink channel, wherein at least one resource reservation, of the one or more resource reservations, is indicated within a control element transmitted with the data; and
   determine whether to include a bitmap or a list in the control element based at least in part on whether the at least one resource reservation of the one or more resource reservations is periodic or aperiodic.

2. The apparatus of claim 1, wherein a size of the control element is based at least in part on a maximum size.

3. The apparatus of claim 1, wherein a size of the control element is based at least in part on a maximum modulation and coding scheme (MCS) increase.

4. The apparatus of claim 3, wherein the maximum MCS increase is based at least in part on a priority associated with the data, a retransmission count associated with the data, whether a resource reservation for the data has been indicated in a previous transmission, or a combination thereof.

5. The apparatus of claim 1, wherein the one or more processors are further configured to:
   transmit sidelink control information (SCI) associated with the data that includes at least one bit indicating that the control element will be transmitted with the data.

6. The apparatus of claim 1, wherein the one or more processors are further configured to:
   transmit sidelink control information (SCI) associated with the data that indicates that the control element will be transmitted with the data and indicates a cast type associated with the control element.

7. The apparatus of claim 1, wherein the one or more processors are further configured to:
   transmit first stage sidelink control information (SCI-1) associated with the data that indicates that the control element will be transmitted with the data; and
   transmit second stage sidelink control information (SCI-2) associated with the data that indicates a cast type associated with the control element.

8. The apparatus of claim 1, wherein the one or more resource reservations include a plurality of resource reservations, and the control element includes a list selected from the plurality of resource reservations based at least in part on:
   times associated with the plurality of resource reservations;
   signal strengths or qualities associated with indicators of the plurality of resource reservations;
   distances between the first UE and the one or more additional UEs associated with the plurality of resource reservations; or
   a combination thereof.

9. The apparatus of claim 8, wherein the list selected from the plurality of resource reservations is further based at least in part on:
   whether the first UE is an intended recipient of a signal associated with one or more of the plurality of resource reservations;
   hop counts associated with indicators of the plurality of resource reservations;
   periodicities associated with the plurality of resource reservations; or
   a combination thereof.

10. The apparatus of claim 8, wherein the control element further indicates:
    whether the first UE intends to receive a signal associated with one or more of the plurality of resource reservations;
    measurements of signal strength or quality associated with the plurality of resource reservations;
    distances associated with the one or more additional UEs;
    identification information associated with the one or more additional UEs; or
    a combination thereof.

11. The apparatus of claim 1, wherein the one or more resource reservations include a resource reservation associated with a medium access control (MAC) layer of the first UE.

12. The apparatus of claim 1, wherein the bitmap indicates the at least one resource reservation of the one or more resource reservations.

13. The apparatus of claim 12, wherein the bitmap is associated with one or more first periodicities, and the control element further includes at least one additional bitmap associated with one or more second periodicities.

14. The apparatus of claim 12, wherein the bitmap is associated with a first periodicity, associated with the one or more resource reservations, and a second, smaller periodicity associated with the one or more resource reservations.

15. The apparatus of claim 1, wherein determining whether to include a bitmap or a list is based at least in part on a size of the control element.

16. An apparatus for wireless communication at a first user equipment (UE), comprising:
- a memory; and
- one or more processors, coupled to the memory, configured to:
- receive, from a second UE and on a sidelink channel, data, wherein at least one resource reservation is indicated within a control element received with the data, wherein the control element includes a bitmap or a list based at least in part on whether the at least one resource reservation is periodic or aperiodic; and
- transmit, on the sidelink channel, based at least in part on resource exclusion using the at least one resource reservation.

17. The apparatus of claim 16, wherein the at least one resource reservation is associated with a signal that the first UE intends to receive.

18. The apparatus of claim 17, wherein the resource exclusion is based at least in part on a signal strength of sidelink control information (SCI) associated with the control element.

19. The apparatus of claim 18, wherein the resource exclusion is based at least in part on a signal strength increment.

20. The apparatus of claim 19, wherein the signal strength increment is based at least in part on a priority associated with the at least one resource reservation.

21. The apparatus of claim 16, wherein the at least one resource reservation is associated with a signal that the second UE intends to receive.

22. The apparatus of claim 21, wherein the resource exclusion is based at least in part on a reported signal strength associated with the at least one resource reservation, a historical signal strength, or a default value.

23. The apparatus of claim 16, wherein the at least one resource reservation is associated with a signal that neither the first UE nor the second UE intends to receive.

24. The apparatus of claim 23, wherein the resource exclusion is based at least in part on a default value.

25. The apparatus of claim 16, wherein the at least one resource reservation is associated with a resource that the first UE intended to use to transmit to the second UE, and the resource exclusion includes a full slot associated with the at least one resource reservation.

26. The apparatus of claim 25, wherein the resource exclusion is based at least in part on a reported signal strength associated with the at least one resource reservation satisfying a threshold.

27. A method of wireless communication performed by a first user equipment (UE), comprising:
- receiving, from one or more additional UEs, one or more indicators corresponding to one or more resource reservations; and
- transmitting data, to a second UE, on a sidelink channel, wherein at least one resource reservation, of the one or more resource reservations, is indicated within a control element transmitted with the data; and
- determining whether to include a bitmap or a list in the control element based at least in part on whether the at least one resource reservation of the one or more resource reservations is periodic or aperiodic.

28. A method of wireless communication performed by a first user equipment (UE), comprising:
- receiving, from a second UE and on a sidelink channel, data, wherein at least one resource reservation is indicated within a control element received with the data, wherein the control element includes a bitmap or a list based at least in part on whether the at least one resource reservation is periodic or aperiodic; and
- transmitting, on the sidelink channel, based at least in part on resource exclusion using the at least one resource reservation.

* * * * *